United States Patent [19]

Emura

[11] Patent Number: 5,459,544
[45] Date of Patent: Oct. 17, 1995

[54] CAMERA WITH A SHAPE MEMORY ALLOY MEMBER

[75] Inventor: Tetsuji Emura, Hachioji, Japan

[73] Assignee: Konica Corporation, Japan

[21] Appl. No.: 187,099

[22] Filed: Jan. 25, 1994

[30] Foreign Application Priority Data

Feb. 1, 1993 [JP] Japan .................. 5-037497

[51] Int. Cl.[6] .................................................. G03B 9/36
[52] U.S. Cl. ..................... 354/245; 354/247; 354/271.1
[58] Field of Search ................... 354/234.1, 245, 354/248, 250, 251, 252, 271.1, 246, 247, 249

[56] References Cited

U.S. PATENT DOCUMENTS 4,664,493  5/1987  Takagi ........................ 354/251 X
5,150,702  9/1992  Miyanaga et al. ............. 354/271.1 X
5,185,621  2/1993  Kagechika .................... 354/234.1

*Primary Examiner*—Howard B. Blankenship
*Attorney, Agent, or Firm*—Jordan B. Bierman; Bierman and Muserlian

[57] ABSTRACT

A camera for exposing photosensitive medium such as a film and a CCD. The camera includes: a lens system for forming a light image on the photosensitive medium; a portion of the camera which requires a control mechanism for a better result of exposing such as an aperture control, an exposure control, a zooming control, and a shutter control; and a driver means for driving such the control mechanism. The driver includes a shape memory alloy member having a first position where said shape memory alloy member is recovered, and a second position where said shape memory alloy member is deformed; and an alloy driving circuit for actuating the shape memory alloy member to the first position.

10 Claims, 34 Drawing Sheets

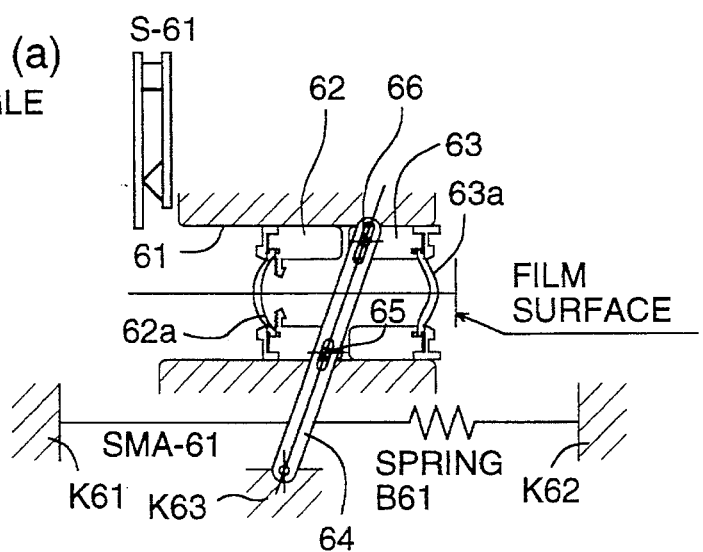
FIG. 24 (a) WIDE ANGLE
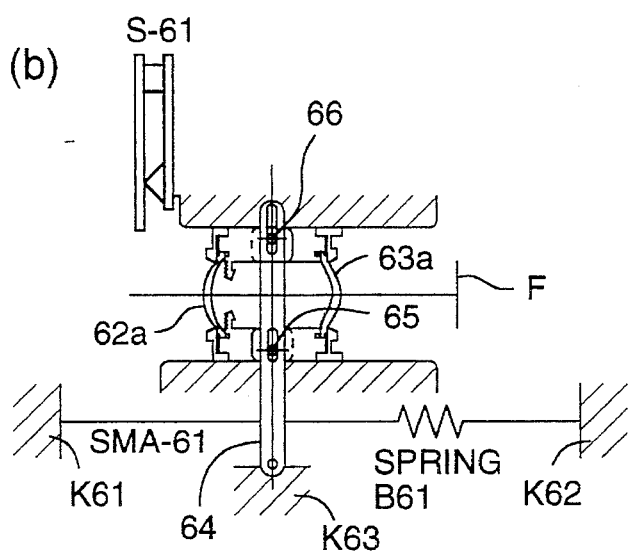
FIG. 24 (b)
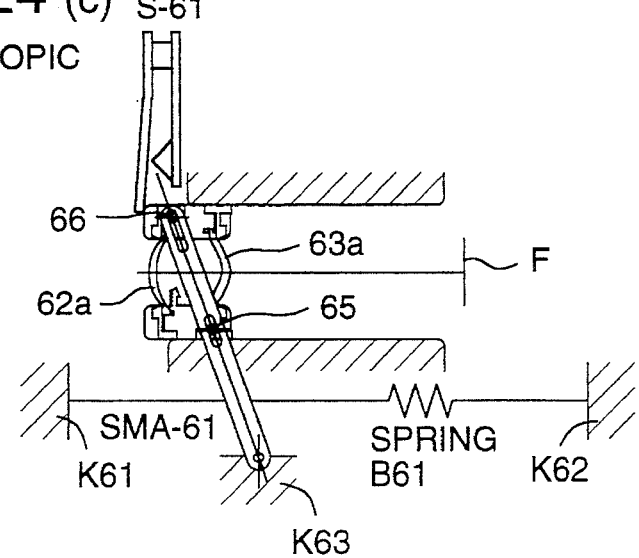
FIG. 24 (c) TELESCOPIC

WIDE ANGLE

MEDIUM

TELESCOPIC

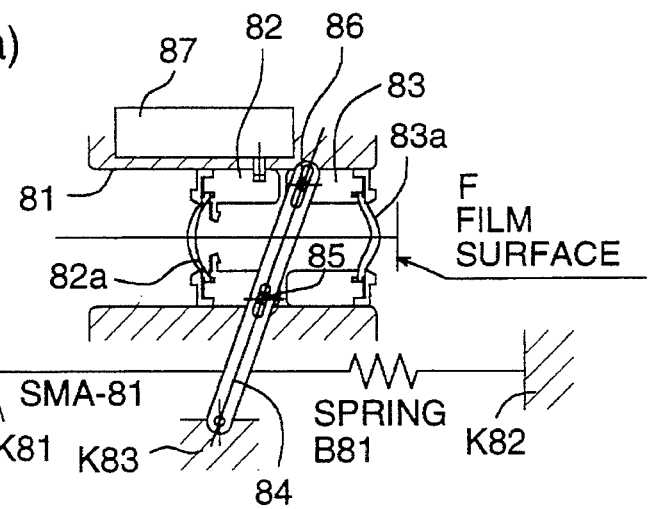
FIG. 29 (a) WIDE ANGLE
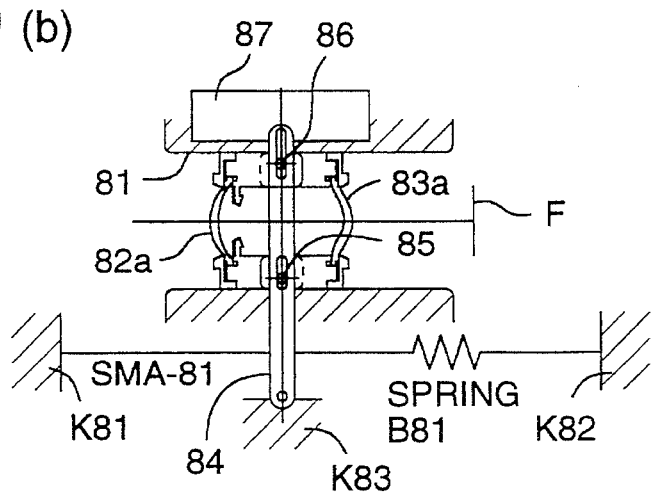
FIG. 29 (b) MEDIUM
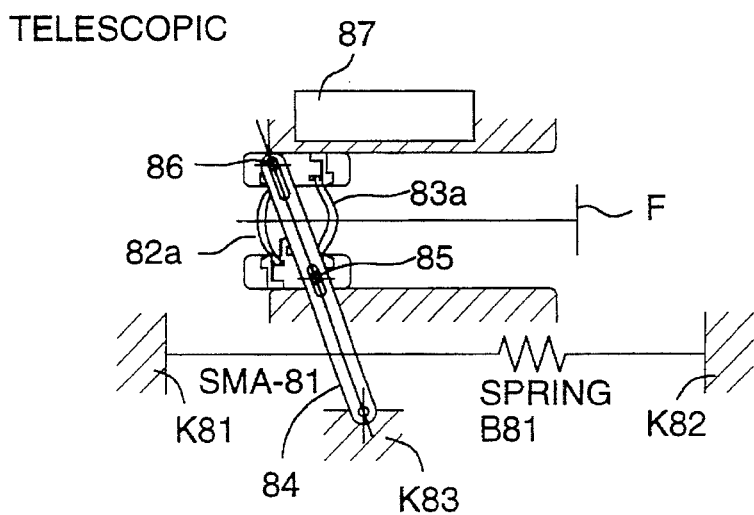
FIG. 29 (c) TELESCOPIC

WIDE ANGLE

MEDIUM

TELESCOPIC

CAMERA WITH A SHAPE MEMORY ALLOY MEMBER

BACKGROUND OF THE INVENTION

The present invention relates to an improvement of various cameras such as a lens-fitted photographic film unit, a simplified camera, a single-lens reflex camera, a video camera and a camera for measuring instruments.

In general, a camera (still camera, lens-fitted photographic film unit, video camera etc.) is equipped with various control means for controlling appropriately photographing conditions such as exposure, a focusing position and magnification (zooming). The control means of this type is required to have a mechanism capable of realizing precise and complicated functions for an improvement of camera performance. On the other hand, however, it is desired that the mechanism mentioned above is omitted or the mechanism is of a simple structure for the purpose of preventing an increase in weight of a camera main body, complicated assembly steps and cost increase.

In a lens-fitted photographic film unit which has come into wide use recently, in particular, it is preferable that these control means are simplified as far as possible. For this reason, therefore, lens-fitted photographic film units which are available on the market are mainly of a fixed exposure system having no aperture-adjusting mechanism. In this case, a fixed exposure of the camera is set fixedly to the condition wherein over exposure tends to be prior to under exposure with an assumption that the camera may be used also for indoor photographing under less quantity of light. This is based on the fact that a photographic film generally has a characteristic that latitude (recording and reproducing power of a film) of the film is wider in an over exposure region than in an under exposure region.

In the case of ordinary photographing such as those for snapshots, over exposure is caused in not a few photographing locations such as the bright outdoors in summer or ski slopes. Therefore, a lens-fitted photographic film unit equipped with an aperture-adjusting mechanism which is light in weight, small-sized and inexpensive is desirable. However, the aperture-adjusting mechanism has many problems of cost increase such as that the structure is complicated and a motor for driving various movable parts including aperture blades is needed. Accordingly, nothing has been realized as a product.

For the same reason as in the foregoing, most of lens-fitted photographic film units and low-priced cameras employ a fixed focus system which does not have an automatic focusing mechanism, Namely, in a dominating camera, an object in the standard position established to be several meters ahead of the camera and those located before and behind the object to be within the depth of field of the camera can be in focus while those in the region (close distance and long distance) other than the foregoing are out of focus. In the case of typical souvenir photographs on the subject of figures and scenery, the fixed focus has its own utility. Due to the low price thereof, a camera wherein better focus condition can be selected has been desired strongly. However, an automatic focusing mechanism requires a mechanism that is equal to or higher than that for the aforementioned aperture-adjusting mechanism on the point of precision and complexity. Therefore, a low-priced lens-fitted photographic film unit provided with a function of this kind has not been realized yet.

For the reason that is exactly the same as above, mechanisms for zooming, automatic film-winding and self timer are not employed in a lens-fitted photographic film unit, and sharp simplification of these mechanisms also for an ordinary camera has been required.

In the conventional camera mentioned above, the biggest problem in simplifying mechanisms for aperture-adjusting and focusing has been lying in a motor which needs to be used as a driving source. Namely, an ordinary electric-powered motor is equipped with a stator provided with a coil for generating a magnetic field and a rotor that is rotated by an interaction with the magnetic field. Therefore, the motor is heavy, the space occupied by the motor is large and the price of the motor is high, which have been disadvantages. This also applies exactly to a direct operated linear motor. A supersonic motor developed recently is light in weight because no coil is used therein. However, it is expensive and it requires precise assembling. Therefore, it has been extremely difficult to use it in a simplified camera such as a lens-fitted photographic film unit.

With a background mentioned above, an object of the invention is to provide a camera equipped with a stop, a focusing mechanism, a zooming mechanism, a automatic film-winding mechanism, a self timer and a shutter all made up of means which are extremely simple and inexpensive.

SUMMARY OF THE INVENTION

For a purpose of achieving the object mentioned above, a camera of the invention is provided with an aperture-adjusting mechanism having therein an actuator capable of making displacement between at least two positions by means of a driving member made of a shape memory alloy so that aperture- adjusting function may be realized with a simple and inexpensive mechanism.

Further, a camera of the invention is provided with a focusing mechanism having therein an actuator capable of making displacement between at least two positions by means of a driving member composed of a shape memory alloy so that focusing function may be realized with a simple and inexpensive mechanism.

Further, a camera of the invention is provided with a zooming mechanism having therein an actuator capable of making displacement between at least two positions by means of a driving member composed of a shape memory alloy so that zooming function may be realized with a simple and inexpensive mechanism.

Further, a camera of the invention is provided with a self-timer mechanism having therein an actuator capable of making displacement between at least two positions by means of a driving member composed of a shape memory alloy so that self-timer function may be realized with a simple and inexpensive mechanism.

Further, a camera of the invention is provided with an automatic film-winding mechanism having therein an actuator capable of making displacement between at least two positions by means of a driving member composed of a shape memory alloy so that automatic film-winding function may be realized with a simple and inexpensive mechanism.

Further, a camera of the invention is provided with a shutter mechanism having therein an actuator capable of making displacement between at least two positions by means of a driving member composed of a shape memory alloy so that shutter function may be realized with a simple and inexpensive mechanism.

The actuator mentioned above is composed of a flat spring having its stable points at two positions on which the aforementioned driving member is provided so that the flat spring may move from its stable point to the other stable point, thus functions including aperture-adjusting, focusing, automatic film-winding, self-timer and shutter are realized with main constituent elements of the flat spring and the member composed of a shape memory alloy.

Further, the driving member composed of the aforementioned shape memory alloy is a metallic fine wire which makes displacement depending on an amount of electric current flowing through the fine wire, thus a shape memory effect can be controlled electrically by an extremely simple mechanism.

Further, the shape memory member is constituted so that it may be positioned at any point through the control of a duty ratio of applying time of an electric current, thus functions of continuously controlled aperture-adjusting focusing, zooming, automatic film-winding, self-timer and shutter have been realized with an extremely simple mechanism.

In the invention, diaphragm blades are constituted so that the first displacement point corresponds to a small aperture opening and the second displacement point corresponds to a full aperture opening. Since these diaphragm blades are moved, depending on an amount of light in the surroundings of a camera, by an actuator equipped with a driving member composed of a shape memory alloy, there can be realized a camera having an automatic aperture-adjusting function achieved by an extremely simple mechanism. In particular, when a flat spring having stable points at two positions is provided with the aforementioned driving member so that the flat spring can move from one stable point to the other stable point thereof, an extremely simple actuator can be structured.

In this case, the driving member composed of a shape memory alloy is a metallic fine wire, and a shape memory effect is produced by heat generated when an electric current flows through the fine wire, and a recovering speed and a deforming speed in shape memory are regulated depending on an amount of an electric current flowing through the fine wire, thus, the driving circuit therefor may be composed of a circuit which is extremely simple.

When an amount of a flowing electric current is controlled by a duty ratio of ON time for the flowing current, positioning at an arbitrary point between the two displacement positions can be done.

In the invention, a lens barrel equipped with a camera lens is structured so that the first displacement point therefor may correspond to a close range for photographing and the second displacement point may correspond to an infinite range. The lens barrel is moved by means of an actuator equipped with a driving member composed of a shape memory alloy depending on output from the range finding section located around a camera, thus, a camera equipped with an automatic focusing function based on an extremely simple mechanism can be realized. In particular, when a flat spring having stable points at two positions is provided with the aforementioned driving member so that the flat spring can move from one stable point to the other stable point thereof, an extremely simple actuator can be structured.

In this case, the driving member composed of a shape memory alloy is a metallic fine wire, and a shape memory effect is produced by heat generated when an electric current flows through the fine wire, and a recovering speed and a deforming speed in shape memory are regulated depending on an amount of an electric current flowing through the fine wire, thus, the driving circuit therefor may be composed of a circuit which is extremely simple.

When an amount of a flowing electric current is controlled by a duty ratio of ON time for the flowing current, positioning at an arbitrary point between the two displacement positions can be done.

In the invention, two lens barrels are structured so that the first displacement point may correspond to a wide angle position and the second displacement point may correspond to a full aperture opening. These lens barrels are moved by an actuator equipped with a driving member composed of a shape memory alloy in accordance with a command of a switching selection button. Therefore, a camera equipped with a zooming function based on an extremely simple mechanism can be realized. In particular, when a flat spring having stable points at two positions is provided with the aforementioned driving member so that the flat spring can move from one stable point to the other stable point thereof, an extremely simple actuator can be structured.

In this case, the driving member composed of a shape memory alloy is a metallic fine wire, and a shape memory effect is produced by heat generated when an electric current flows through the fine wire, and a recovering speed and a deforming speed in shape memory are regulated depending on an amount of an electric current flowing through the fine wire, thus, the driving circuit therefor may be composed of a circuit which is extremely simple.

When an amount of a flowing electric current is controlled by a duty ratio of ON time for the flowing current, positioning at an arbitrary point between the two displacement positions can be done.

In the invention, a switch coupled with a shutter is provided at an appropriate position in the vicinity of a recovery completion point of a driving member composed of a shape memory alloy, and it is turned on with a delay of a time period from the start to completion of recovery of the driving member. Since a timer can be set with parameters of recovery time of the driving member and a mounting position for the switch, a camera equipped with a self timer function based on an extremely simple mechanism can be realized.

In this case, the driving member composed of a shape memory alloy is a metallic fine wire, and a shape memory effect is produced by heat generated when an electric current flows through the fine wire, and a recovering speed and a deforming speed in shape memory are regulated depending on an amount of an electric current flowing through the fine wire, thus, the driving circuit therefor may be composed of a circuit which is extremely simple.

In the invention, a sprocket geared with a film-winding mechanism is structured so that the start point of a gear tooth corresponds to the first displacement point and the stop point thereof corresponds to the second displacement point. The sprocket is moved by an actuator provided with a driving member composed of a shape memory alloy so that the teeth corresponding in number to one frame may be advanced being coupled with a shutter mechanism. Therefore, a camera equipped with an automatic film-winding mechanism of an extremely simple mechanism can be realized.

In this case, the driving member composed of a shape memory alloy is a metallic fine wire, and a shape memory effect is produced by heat generated when an electric current flows through the fine wire, and advancement of the teeth corresponding in number to one frame is controlled by the number of electrifying pulses in a pulse generator thus, the driving circuit therefor may be composed of a circuit which is extremely simple.

In the invention, when a shutter is trigged for operation by the displacement of a driving member composed of a first shape memory alloy and charged by the displacement of a driving member composed of a second shape memory alloy, there can be realized a camera equipped with a shutter mechanism composed of an actuator with an extremely simple structure.

In this case, two driving members each composed of a shape memory alloy represent a metallic fine wire, and a shape memory effect is produced by heat generated when an electric current flows through the fine wire, and it is controlled by a switch which is turned on and off. Therefore, the driving circuit therefor may be composed of a circuit which is extremely simple.

BRIEF DESCRIPTION OF THE DRAWINGS

FIGS. 24(a)–24(c) represent a structural diagram of a 2-step zooming mechanism equipped with a driving member composed of an SMA (a shape memory alloy) fine wire.

FIGS. 29(a)–29(c) represent a structural diagram of a continuous zooming mechanism equipped with a driving member composed of an SMA (a shape memory alloy) fine wire and a spring.

DETAILED DESCRIPTION OF THE INVENTION

A shape memory alloy(hereinafter abbreviated to SMA) is a material whose shape is subjected to change (deformation) when its temperature changes, and it is highlighted as a material with a new function. First, a principle of its behavior will be explained briefly as follows.

Figure 1:
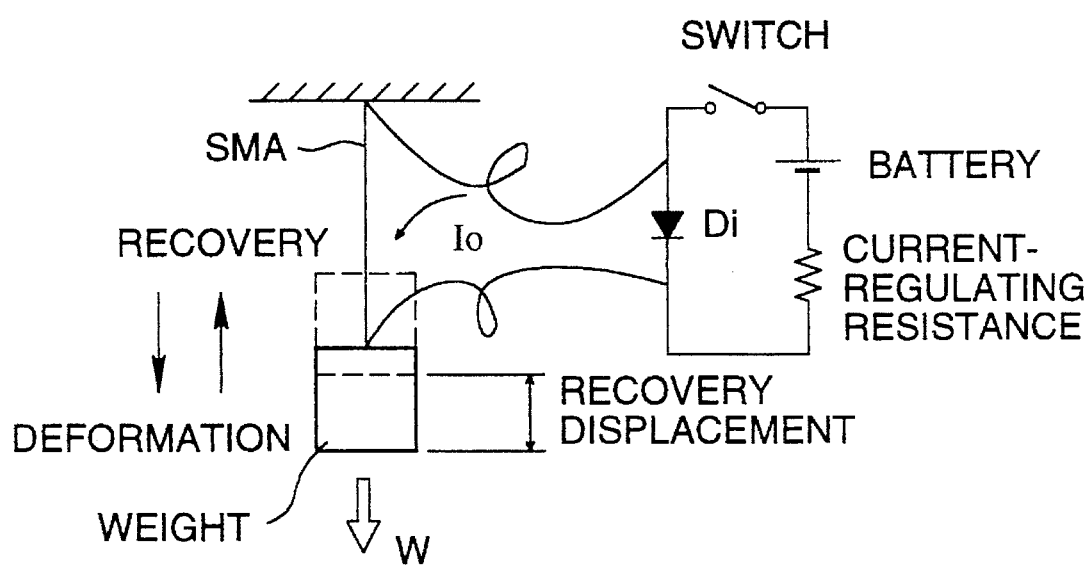
FIG. 1 is a diagram illustrating the principle of the displacement mechanism of SMA (a shape memory alloy).

In an illustration in FIG. 1 explaining a principle, a weight having weight of W is suspended from the lower end of an SMA which is a fine wire. When lead wires are connected to both ends of the SMA and current $I_0$ flows through them, the SMA itself is heated to high temperatures due to Joule heat effect caused by electric resistance, and it shrinks(in an arrowed recovery direction in the figure) by an amount called recovery displacement, against the weight. After that, when a supply of electricity is cut, the SMA is cooled to extend due to spontaneous radiation of heat, and returns to its original position(an arrowed deformation direction in the figure).

Figure 2:
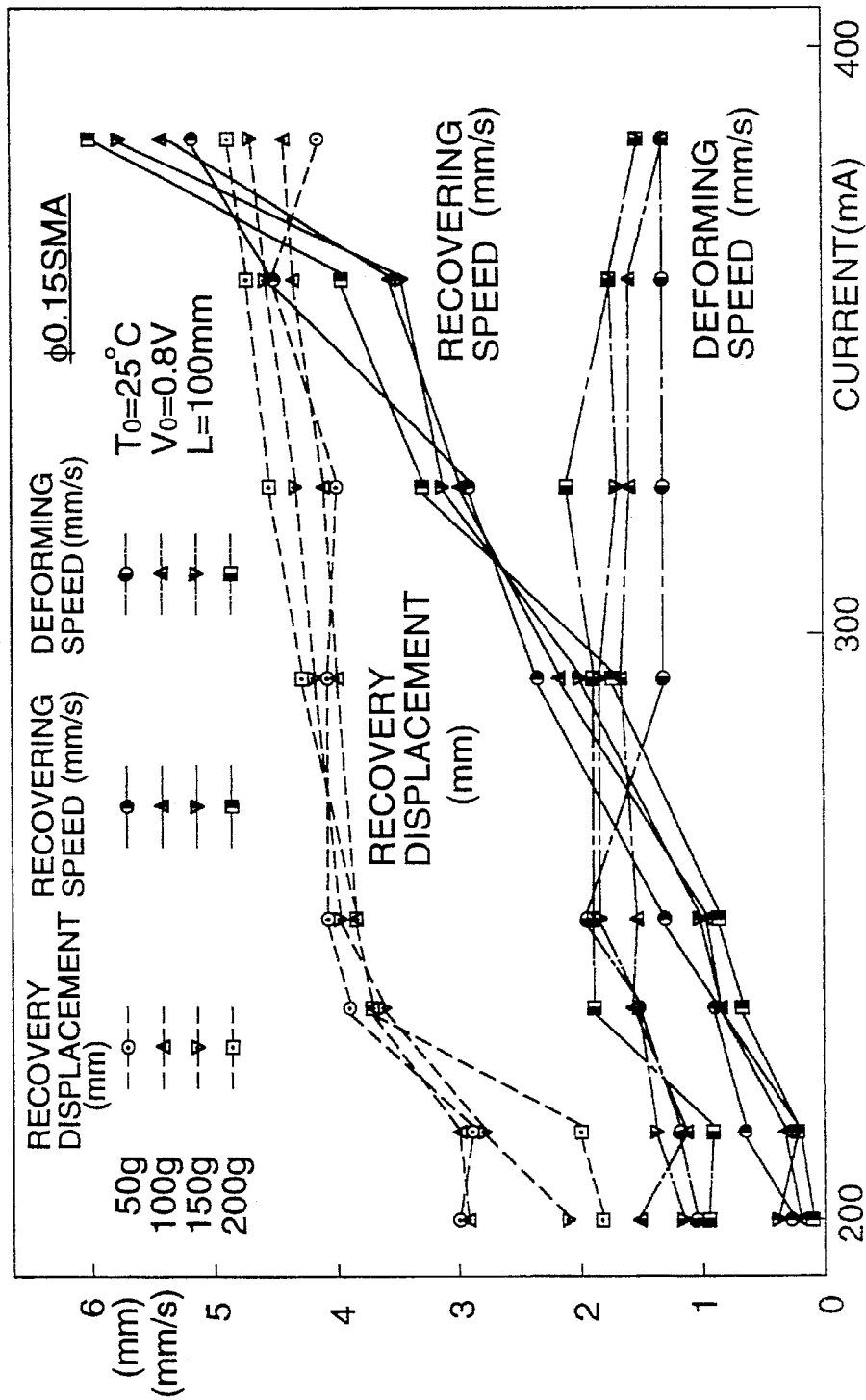
FIG. 2 is a characteristic diagram wherein SMA (a shape memory alloy) is driven with a fixed current.

FIG. 2 represents a measurement example wherein an SMA fine wire showing the recovery displacement and the deformation displacement as those mentioned above is heated by fixed electric current. In the figure, the axis of abscissa represents time, while the axis of ordinates represents a recovery displacement, its speed and the speed for deforming to the original position when a supply of electricity is cut. The figure shows a summary of displacement characteristics wherein the weight of weight W is changed under the condition of the constant ambient temperature. The figure shows, as a rough tendency, that the SMA starts recovering when an amount of electricity supplied reaches a predetermined value of electric current, but its "amount of recovery displacement" is not so changed even if an amount of electricity supplied is increased. On the contrary, it is understood that "recovery speed" is almost proportional to a value of electric current supplied. Further, "deformation speed" is almost independent of a value of electric current. With regard to an influence of weight W, no primary features are observed within a range of 50–200 g as shown in FIG. 2.

Figure 3:
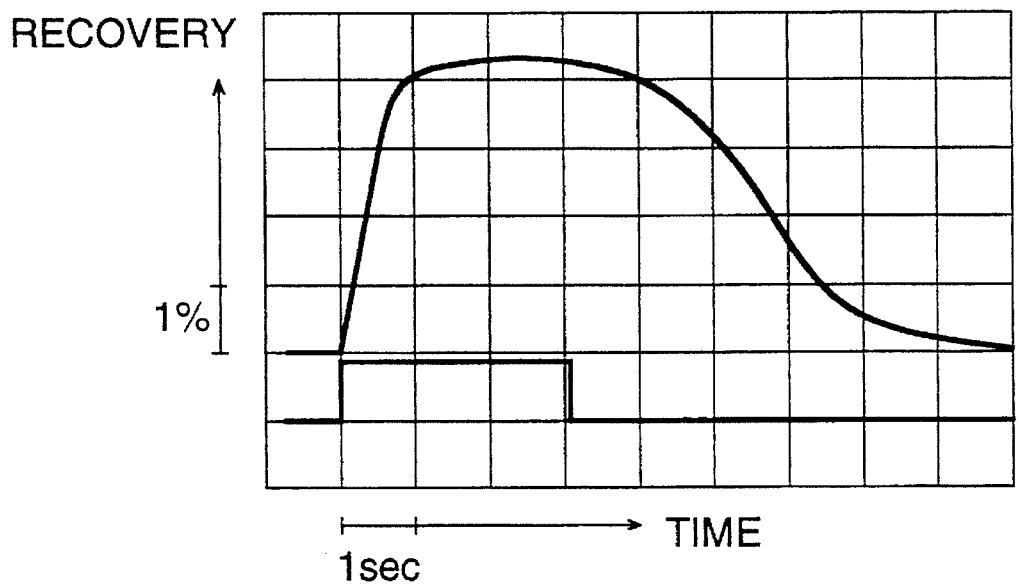
FIG. 3 is a characteristic diagram showing ON time for a flowing current, recovery of SMA, and deformation of SMA all on the occasion that SMA (a shape memory alloy) is driven with a fixed current.

FIG. 3 shows an example wherein the behavior of the SMA mentioned above are observed actually by an oscilloscope. In the figure, the axis of abscissa represents time and the axis of ordinates represents recovery displacement, and one division of the axis of abscissa represents one second, while one division of the axis of ordinates corresponds to about 1% wherein the recovery displacement is expressed in an amount of deformation. In the figure, the upper curve represents recovery displacement, while the lower pulse-shaped line represents time for supplying electricity. In FIG. 3, when electricity starts flowing, recovery starts, and after the recovery is finished within a certain period of time, the displacement amount is not so changed even if electricity keeps flowing further. A rising gradient of the recovery curve corresponds to the recovery speed mentioned previously. When a supply of electricity is cut, the SMA returns to its original position at its deformation speed.

Each of graphs in FIGS. 4–8 represents an example wherein time for supplying electricity is made short so that deformation may be made before the maximum recovery displacement is attained.

In each of FIGS. 3–8 the speed of the recovery movement is the same and a process thereof is almost the same because an electric current value, load W and ambient temperature are the same in all examples. These behaviors can be understood when considering as follows, referring to FIG. 9 in which characteristics diagrams (a)–(f) are all superimposed.

An SMA, when it reaches a certain temperature, has its own specific temperature(a recovery-starting point), and then, when it reaches its second specific temperature(a saturation point), the recovery is saturated and no further change is made. In addition, since temperature of the SMA depends on its amount of radiation of heat(determined by an amount of heat generated by itself and ambient temperature), the more an amount of current is, the faster the temperature rise is, resulting in elevated recovery speed.

The deforming speed, on the other hand, can be considered as heat radiation time during which the temperature of the SMA reaches the ambient temperature. Therefore, when the ambient temperature is constant, the deforming speed is almost constant, provided, however, that the SMA is not superheated unnecessarily after it has passed its saturation temperature mentioned above. With respect to such characteristics of an SMA, various studies (see, for example, Bull. Jpn. Inst. Metals. Vol. 24, No. 1, 1985) have been made. Therefore, explanation therefor will be omitted.

Figure 10:
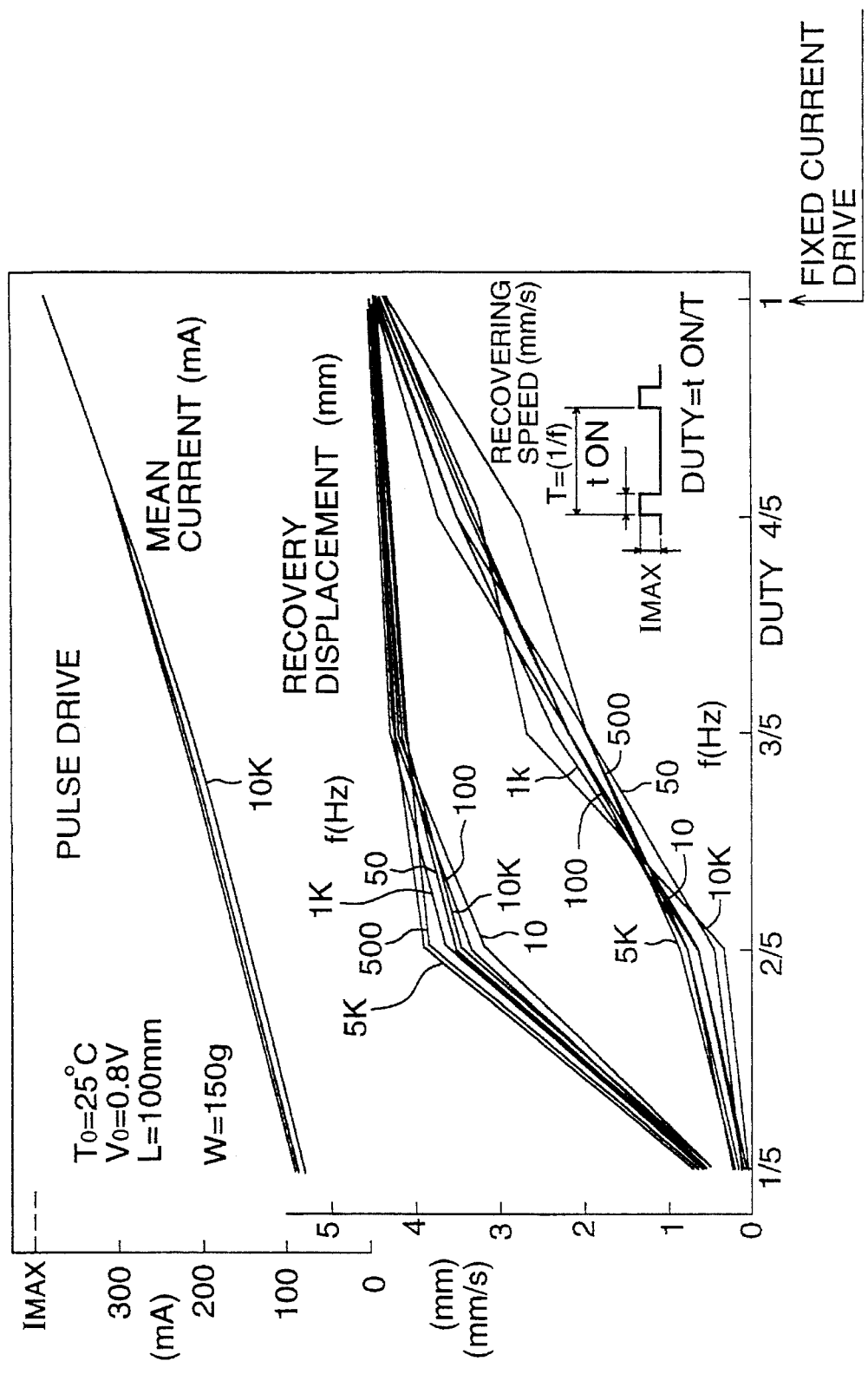
FIG. 10 is a characteristic diagram showing recovery displacement and a recovery speed of SMA for a duty ratio on the occasion that SMA (a shape memory alloy) is pulse-driven.

Pulse drive which is another driving method will be explained as follows, next. FIG. 10 shows an example wherein an SMA is heated by means of a pulse electric current. This is a method for controlling a supply of electricity by frequency f, namely by a DUTY ratio which is the ratio of cycle T(=1/f) to ON time $t_{on}$. Within a period of ON time, an SMA is heated and thereby starts recovering, while, within a period of OFF time, it is cooled spontaneously and it stops recovering and deforms. However, depending on the value of DUTY ratio, ON time for the following cycle comes before the complete deformation, and recovery is started. Accordingly, when frequency f is high enough to be equal to or higher than a certain level, its variation can be almost ignored, and there are presented characteristics showing that an SMA is apparently heated slowly and continuously.

In fact, if DUTY ratios represented by the axis of abscissa are regarded as values of electric current in FIG. 10, the characteristics curves therein appear to be those closely resembling those in FIG. 2. This pulse electric current drive has a merit that less electric current is required compared with fixed electric current drive for obtaining the same recovery displacement and the same recovering speed. In addition, each characteristic depends only upon a DUTY ratio and it hardly depends on frequency f if the frequency is equal to or higher than a certain level.

Among other things, this method can provide a special application means wherein there can be structured a stepless actuator capable of moving freely between two displacement points at a high temperature side and a low temperature side, in place of a binary switch which reciprocates on an ON and OFF basis between displacement points at a high temperature side and a low temperature side (=ambient temperature) as in fixed electric current heating drive.

A first example wherein the characteristics of the SMA mentioned above are utilized in the 2-step aperture-adjusting control will be explained as follows.

Figure 11:
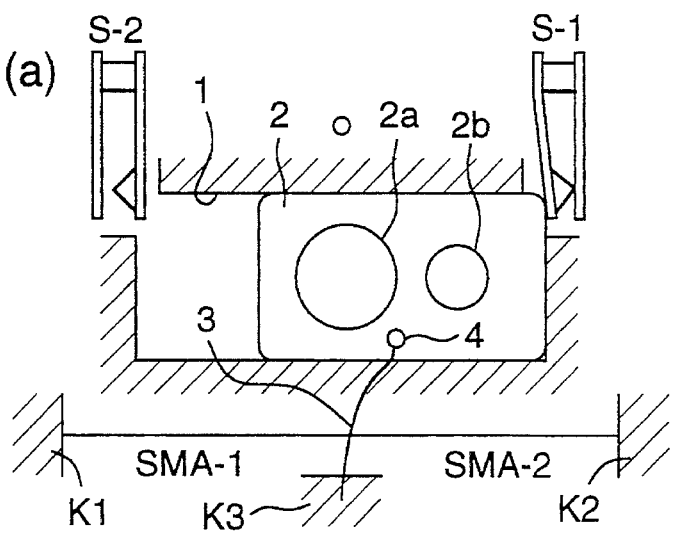
FIGS. 11(a)–(c) are structural diagrams each showing a 2-step aperture-adjusting mechanism equipped with an actuator having a driving member composed of an SMA (a shape memory alloy) fine wire.
Figure 11:
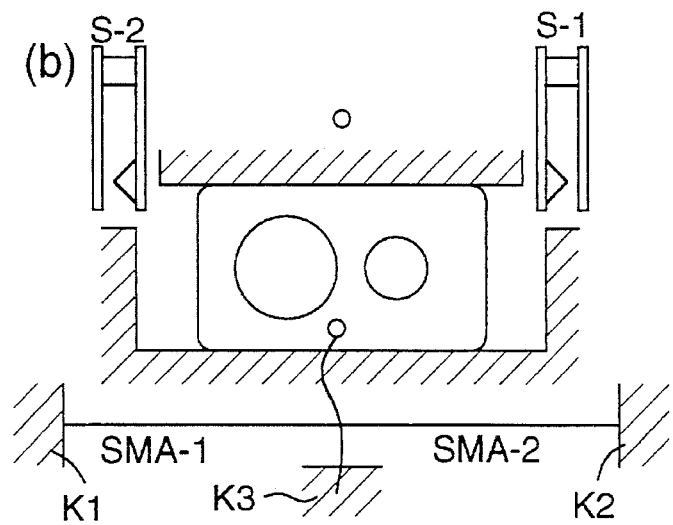
Figure 11:
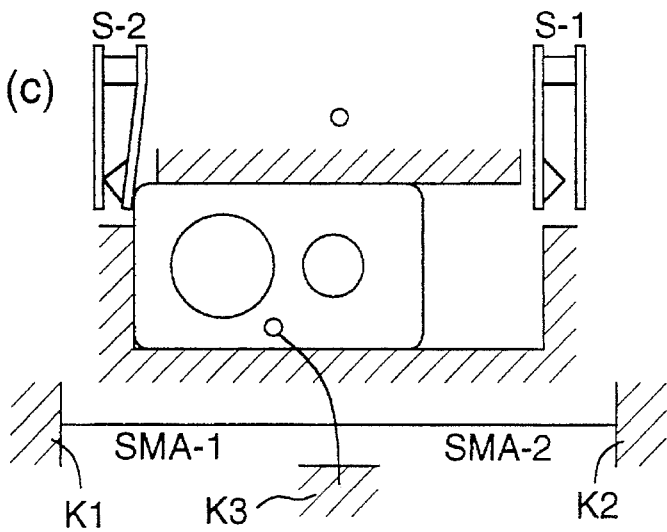
Figure 12:
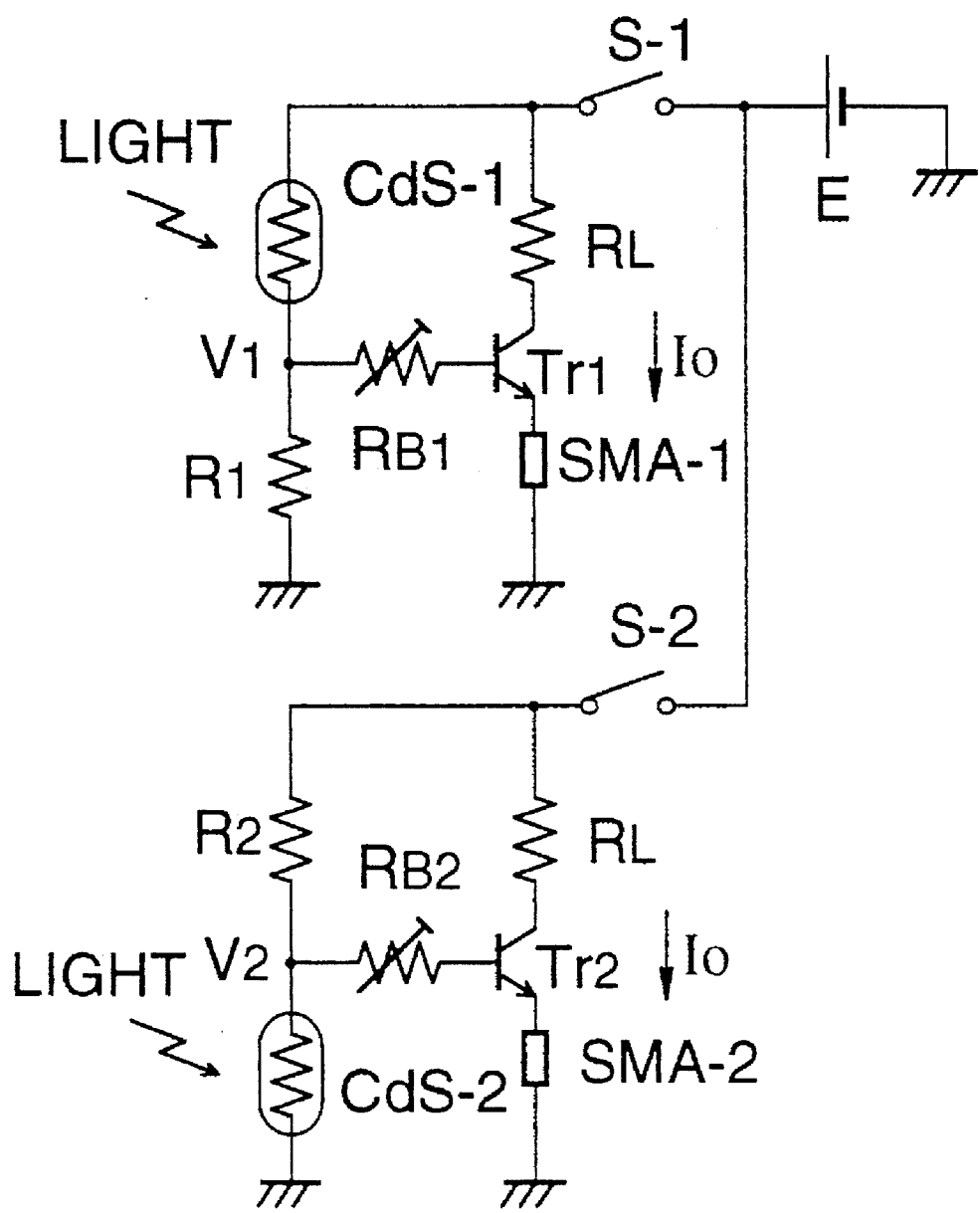
FIG. 12 is a diagram showing a driving circuit for a 2-step aperture-adjusting mechanism equipped with an actuator having an SMA (a shape memory alloy) driving member.

The first example is shown in FIG. 11 and an example of a driving circuit therefor is shown in FIG. 12. First, as shown in FIG. 11(a), aperture blade 2 is supported on camera outer frame 1 to be movable in the lateral direction (cross-sectional direction) against a photographing optical system. In addition, two leaf switches S-1 and S-2 are affixed so that they may be turned on and off being coupled with aperture blade 2 as shown in the figure.

On the aperture blade 2, there are provided two openings 2a (large diameter) and 2b (small diameter) each having different diameter. An upper end of leaf spring 3 whose lower end is supported on fixing section K3 on a cantilever basis is engaged rotatably with engagement pin 4 affixed on the aperture blade 2. In this case, leaf spring 3 is structured so that a vertical length of the leaf spring 3 is longer than the shortest distance (the distance measured when the engagement pin 4 is right over the fixing section K3) between the fixing section K3 and the engagement pin 4, and when the engagement pin 4 is located right over or in the vicinity of the fixing section K3, the leaf spring 3 is subjected to the S-shaped deformation to be extremely unstable.

In FIG. 11(a), the aperture blade 2 is urged toward the right side by the leaf spring 3. On the leaf spring 3, there are affixed the ends of two fine wires SMA-1 and SMA-2 both composed of an SMA (a shape memory alloy) so that they pull the leaf spring 3 toward both sides, while the other ends of the fine wires SMA-1 and SMA-2 are affixed on fixing sections K1 and K2.

Drive circuit C1 which drives SMA-1 and SMA-2 is composed of an extremely simple circuit that drives an SMA by turning on and off transistor switches Tr1 and Tr2 with light-intercepting units CdS-1 and CDS-2 whose resistance varies depending on brightness. In this circuit, base voltage V1 and V2 of two transistors vary depending on brightness sensed by the light-intercepting units CdS-1 an CDS-2, and Tr1 shows high base voltage V1 under the bright condition, while Tr2 shows high base voltage V2 under the dark condition. Therefore, it is possible to set ON-OFF conditions which depend on brightness that enters the light-intercepting unit of each transistor by adjusting base input resistance $R_B$ 1 and $R_B$ 2.

Namely, for example, assumptions
CdS dark resistance: 1MΩ
CdS bright resistance: 100 kΩ
R1=2MΩ
R2=200 k
E=3 V
are followed by the following corresponding relations.
V1=1.0 V (dark), 2.9 V (bright)
V2=2.5 V (dark), 1.0 V (bright)

When any transistor is turned on by the brightness reaction, electricity in an electric current amount set by electric current restricting resistance RL flows through the SMA corresponding to transistor TR1 or Tr2.

In FIG. 11 again, FIG. 11a shows the state of ordinary photographing mode wherein opening 2a with a large aperture diameter is positioned on optical axis O. Under this state, switch S-1 is turned on and switch S-2 is turned off, and therefore no electricity is supplied to transistor Tr2 and thereby SMA-2 does not exert any action.

In this case, since base input resistance $R_B$ 1 is established so that transistor TR1 may be turned on when quantity of light in the photographing place is increased to exceed the latitude of a photographic film, electricity flows through SMA-1. In this case, the driving member SMA-1 is heated by electricity flowing through it and starts shrinking to pull the leaf spring 3. Then, aperture blade 2 engaged with the leaf spring 3 is moved toward the left side, and thereby driving member SMA-2 that is not electrified is also extended (FIG. 11-b). When engagement pin 4 which causes the leaf spring 3 and the aperture blade 2 to be engaged with each other is moved to the position that is just over the fixing section K3 or in the vicinity thereof, switch S-1 coupled with the aperture blade 2 is turned off and the leaf spring 3 is subjected to S-shaped deformation to be extremely unstable. Namely, the leaf spring 3 is caused to be in unstable state wherein it returns to the state shown in FIG. 11-a again seeking the stable point at the right end or the left end, or it goes directly to the left.

When a position of switch S-1 is set so that the switch S-1 is turned off after engagement pin 4 has come to the position that is slightly on the left of the position right above the fixing section K3, the aperture blade 2 moves to the left end and thereby the aperture is switched to the state of a small aperture. In this case, transistor Tr 1 is under the condition of being capable to be turned on. However, the switch S-1 has already been turned off. Therefore, electricity does not keep flowing. Switch S-2, on the other hand, is on the state of ON, but light-intercepting unit CdS-2 is on the bright state. Therefore, base voltage of transistor Tr-2 is low, and base input resistance $R_B2$ is set so that the transistor Tr 2 is turned off. Therefore, no electricity flows through this side. Namely, small aperture 2b can be maintained stably.

Next, when quantity of light in the surrounding that encircles a camera is changed to the level under which an appropriate exposure can be secured even with large aperture 2a, the transistor Tr 2 is turned on and thereby electricity flows through driving member SMA-2, thus aperture blade 2 is moved in the reverse direction (toward the right side in the figure) through the same mechanism as in the foregoing, and state returns to one shown in FIG. 11-a.

Figure 4:
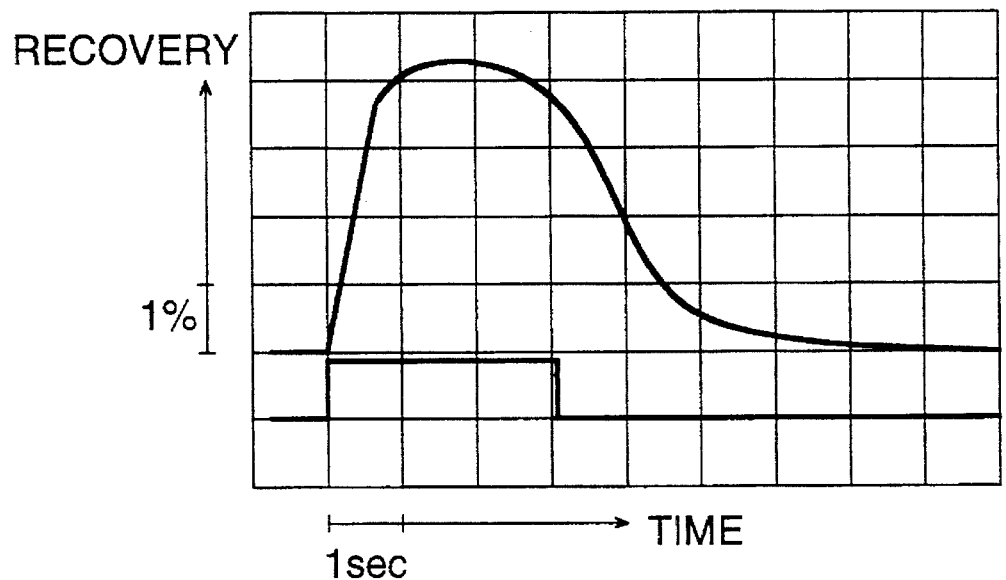
FIG. 4 is a characteristic diagram showing ON time for a flowing current, recovery of SMA, and deformation of SMA all on the occasion that SMA (a shape memory alloy) is driven with a fixed current.
Figure 5:
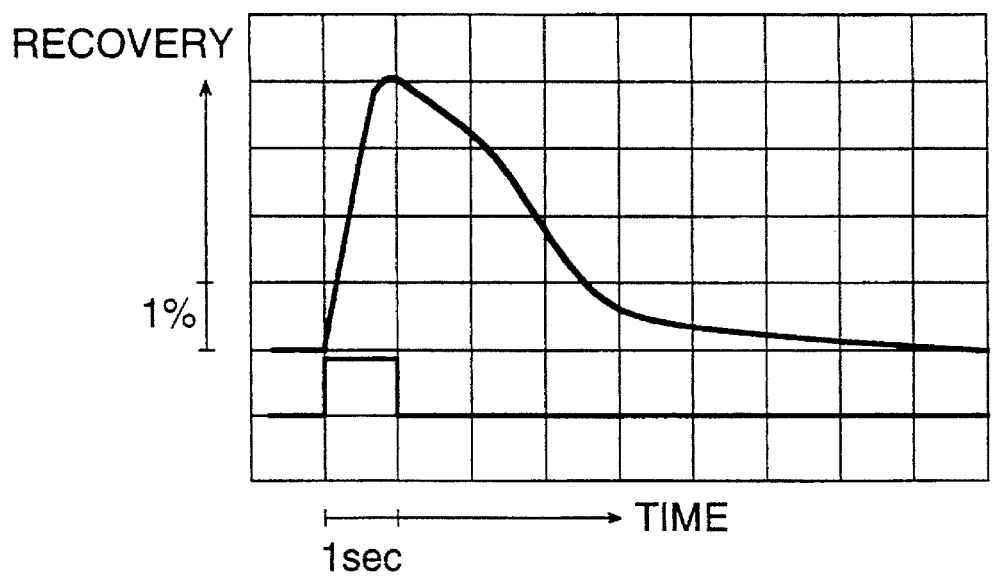
FIG. 5 is a characteristic diagram showing ON time for a flowing current, recovery of SMA, and deformation of SMA all on the occasion that SMA (a shape memory alloy) is driven with a fixed current.
Figure 6:
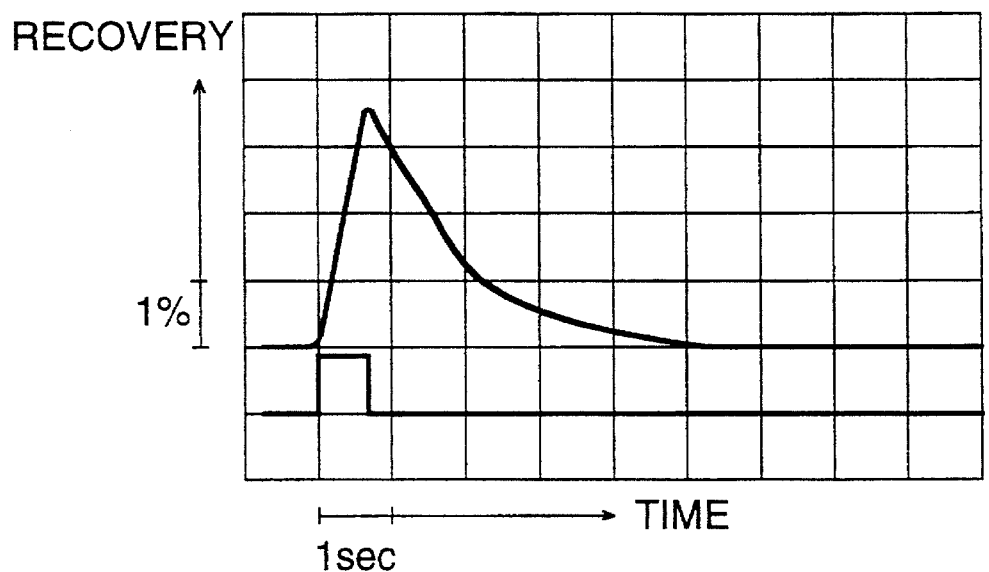
FIG. 6 is a characteristic diagram showing ON time for a flowing current, recovery of SMA, and deformation of SMA all on the occasion that SMA (a shape memory alloy) is driven with a fixed current.
Figure 7:
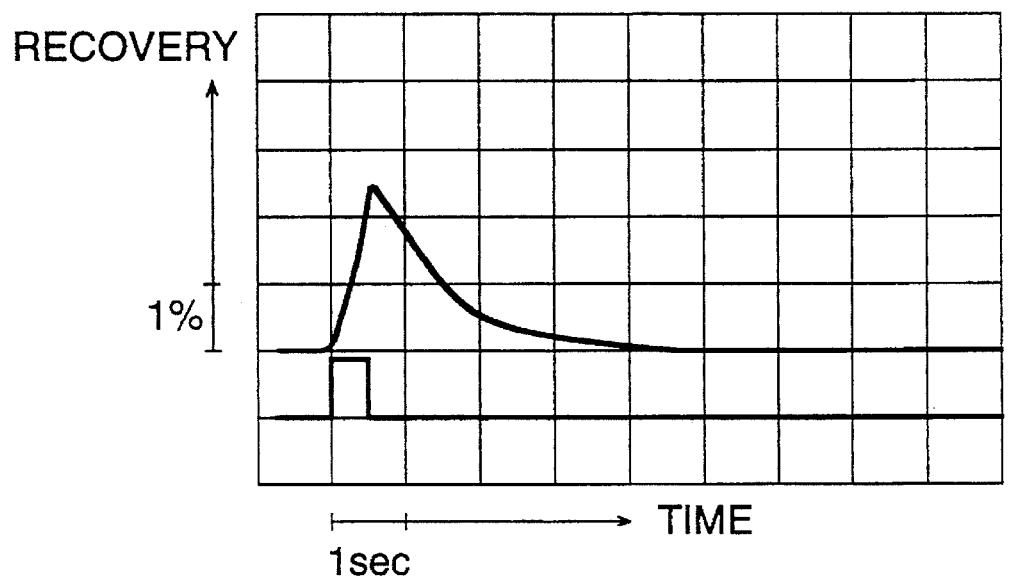
FIG. 7 is a characteristic diagram showing ON time for a flowing current, recovery of SMA, and deformation of SMA all on the occasion that SMA (a shape memory alloy) is driven with a fixed current.
Figure 8:
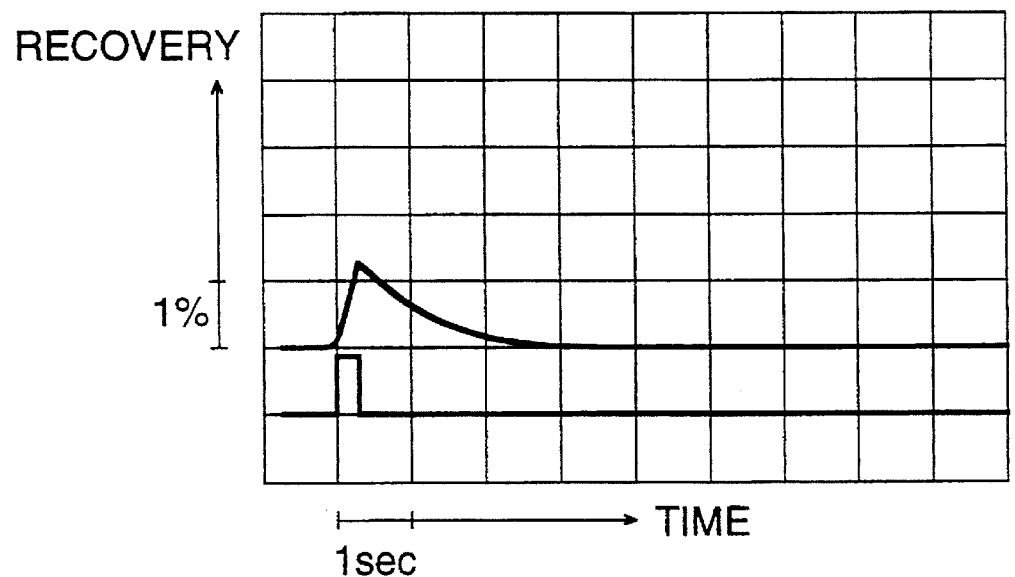
FIG. 8 is a characteristic diagram showing ON time for a flowing current, recovery of SMA, and deformation of SMA all on the occasion that SMA (a shape memory alloy) is driven with a fixed current.

In the aperture-adjusting mechanism as that mentioned above, electricity flows through driving member SMA only when the aperture blade 2 moves from a stable point on one side to that on the other side. Therefore, power consumption in an extremely small amount is enough. Accordingly, a value of electric current has only to be set, taking the recovering speed of the driving member SMA shown in FIG. 2 into consideration. Further, a necessary amount of recovery is determined by ON time as shown in FIG. 3. Namely, the necessary amount of recovery can be determined only by establishing affixing positions for switch S-1 and switch S-2, because the recovery speed is constant once the value of electric current has been fixed as shown in FIG. 4.

In other words, when the aperture-adjusting mechanism described above and a driving circuit therefor are used, quantity of light that causes an aperture to be changed can be established independently for both bright and dark states, and the recovery speed can also be selected freely because electricity flows through each of driving members SMA-1 and SMA-2 only for a short period of time. In addition, electrifying time can be set independently only through the selection of affixing positions for switches S-1 and S-2. Among other things, a driving source requires only an SMA fine wire which is extremely low-priced compared with a motor and a driving circuit therefor is also extremely simple, which is different from a conventional aperture-adjusting mechanism. Though energy efficiency of an SMA itself is lower than that of a motor, operation time of the SMA is extremely short as mentioned above. Therefore, no problem is caused in practical use.

By using, as mentioned above, an aperture-adjusting mechanism having therein an actuator capable of making displacement between at least two points due to a driving member composed of a shape memory alloy, a camera equipped with an extremely low-priced 2-step aperture-adjusting mechanism has been realized.

Incidentally, the example described above is only one example of applications of the invention, and the invention can naturally be applied also to all image-related equipment including a video camera and a copying machine as well as various optical equipment, in addition to a camera.

Next, there will be explained a camera equipped with a stepless aperture-adjusting mechanism which has been achieved by developing the aperture-adjusting mechanism in the first example.

Figure 13:
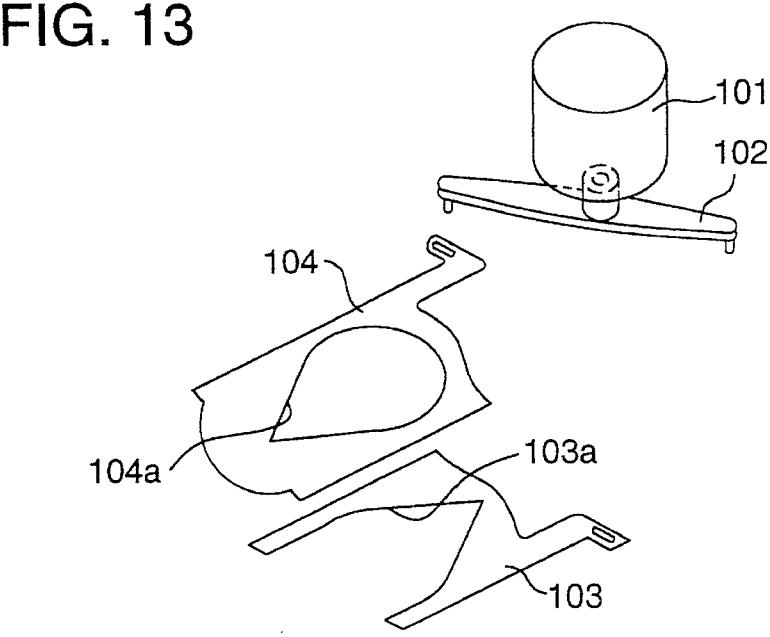
FIG. 13 is a basic structural diagram of a stepless aperture-adjusting mechanism.
Figure 14:
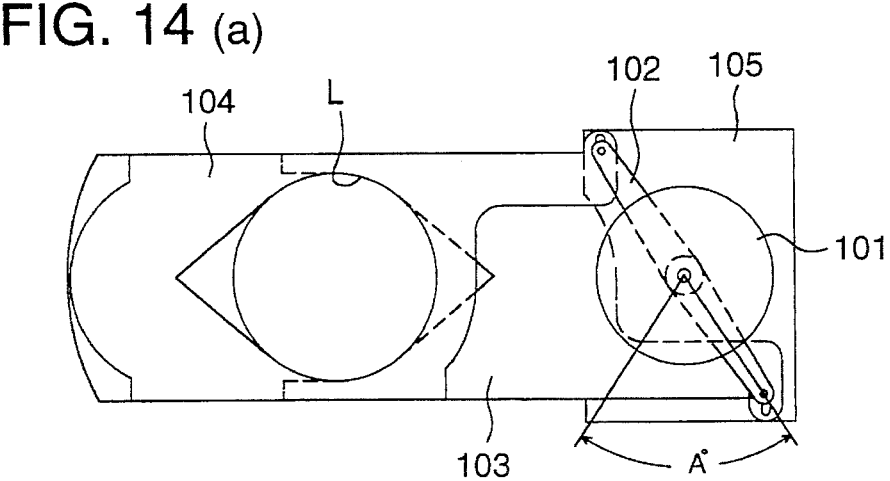
FIGS. 14(a) and 14(b) represent an illustration showing the principle of dimming for the stepless aperture-adjusting mechanism.
Figure 14:
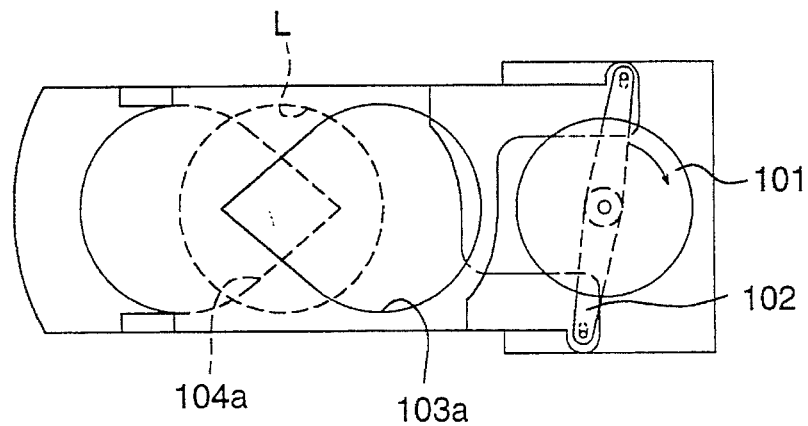

In the known example of the simplest stepless aperture-adjusting unit, there are provided aperture blade 103 having thereon opening 103a and aperture blade 104 having thereon opening 104a as shown in FIG. 13, and lever 102 that drives both aperture blades 103 and 104 is provided with motor 101. The symbol L represents a full aperture window which is coaxial with a photographing optical axis. As shown in FIG. 14, an area of the opening (how aperture blades 103 and 104 are superimposed) is changed by rotating the lever 102 with the motor 101 within a predetermined angular range, which is on an extremely simple principle. Though this conventional example is simple in its own way, it is not suitable in terms of cost for a low-priced camera aimed by the invention.

The second example wherein lever 102 is driven not by motor 101 in a conventional unit but by the aforementioned SMA will be explained as follows, referring to FIG. 15.

In the figure, lever 12 corresponds to lever 102 of a conventional unit shown in FIGS. 14(a) and 14(b). Other members, namely, aperture blades 103 and 104 and their openings 104a and 104b, as well as lens opening L are exactly the same, in terms of arrangement, as those in a conventional unit shown in FIGS. 13 and 14 (not shown).

Figure 15:
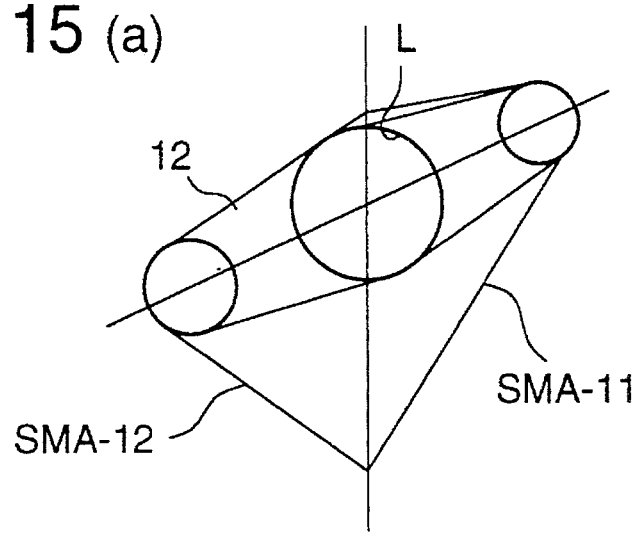
FIGS. 15(a)–15(c) represent a structural diagram showing the principle of the occasion wherein a lever of the stepless aperture-adjusting mechanism is driven by a driving member composed of an SMA (a shape memory alloy) fine wire.
Figure 15:
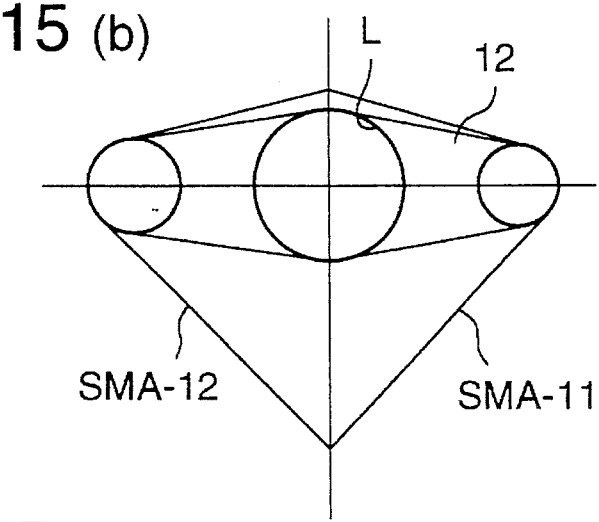
Figure 15:
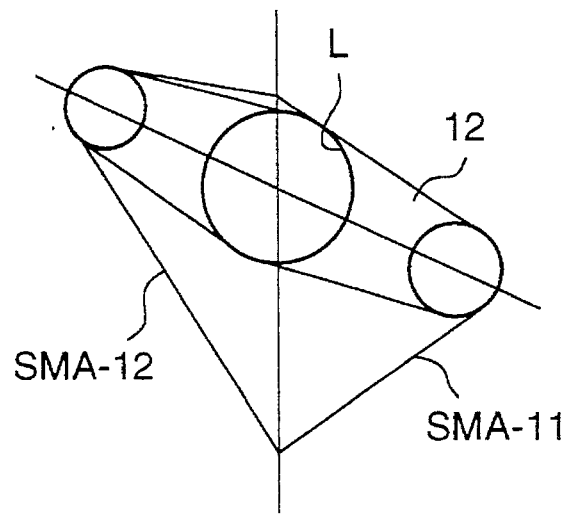

FIG. 15-a shows a lever position corresponding to the open state shown in FIG. 14-a, and SMA driving members SMA-11 and SMA-12 composed of two fine wires are connected to the lever 12, and each end of the fine wire is fixed. FIG. 15-a shows the state wherein the SMA-12 is the longest, while the SMA-11 is the shortest.

When SMA-11 is electrified and thereby heated, the lever 2 is rotated because the SMA-11 starts recovering (shrinking), and is brought to the lever position for the small aperture shown in FIG. 15-c (corresponding to FIG. 14-b) through the state shown in FIG. 15-b.

When SMA-12, on the contrary, is electrified and thereby heated when it is in the state of FIG. 15-c, the SMA-12 starts recovering (shrinking) and is brought to the state shown in FIG. 15-c through FIG. 15-b. In short, the lever position can be freely set between the state in FIG. 15-a and the state in FIG. 15-c, namely between the full aperture and a small aperture depending on how two SMA fine wires are pulled. When an actuator provided with SMA driving member capable of being subjected to displacement between two points as in the foregoing, it is possible to rotate the lever 2 freely without using a motor.

Figure 16:
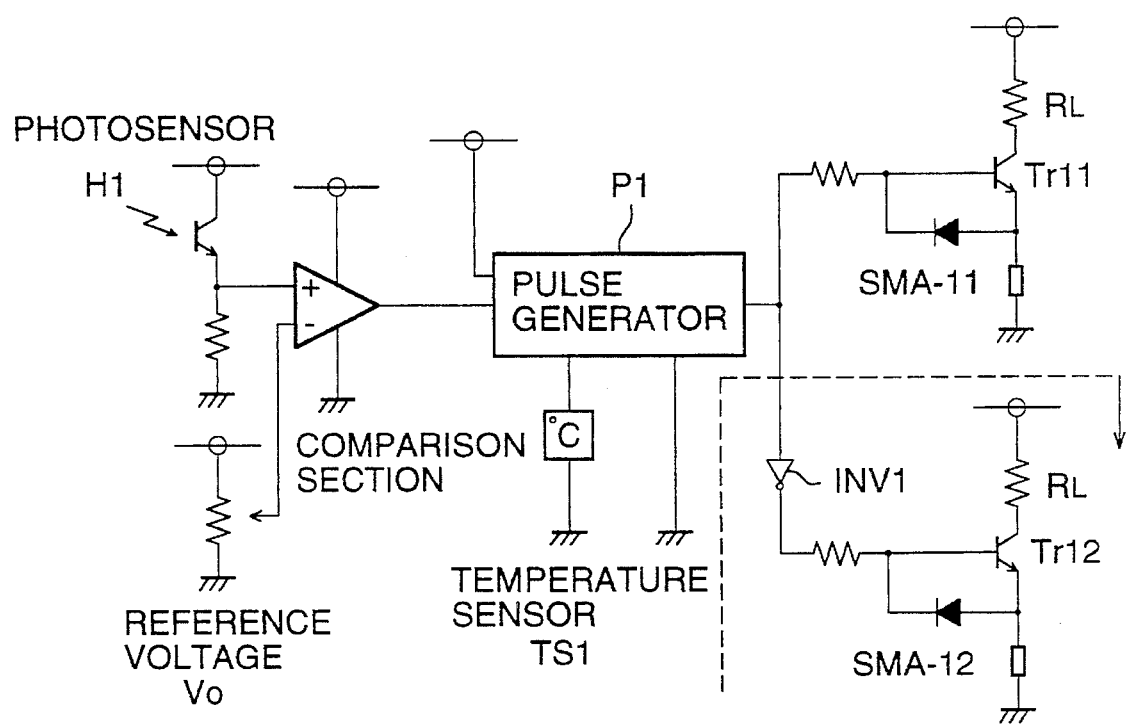
FIG. 16 is a diagram of a driving circuit wherein a lever of the stepless aperture-adjusting mechanism is driven by a driving member composed of an SMA (a shape memory alloy) fine wire.

FIG. 16 is a structural diagram of driving circuit C2 which drives, on a stepless basis, the aperture-adjusting mechanism mentioned above. This circuit is structured so that quantity of light in the surrounding encircling a camera may be received by photosensor H and then be compared with reference voltage $V_0$ so that the output corresponding to the difference resulted from the comparison may change the DUTY ratio of pulses from pulse-generating section P. Namely, the SMA is driven by the ratio of ON time for electrifying the SMA, namely by the control of electrifying by means of the DUTY ratio.

In this case, SMA-11 and SMA-12 are opposite each other in terms of directions of their recovery and deformation. Therefore, with regard to input to transistor Tr 11 that electrifies SMA-11 and SMA-12 from the pulse-generating section P, input on one side only is reversed by inverter INV. Namely, the SMA-11 and the SMA-12 are arranged in a way that they are driven so that the sum of the DUTY ratio of the SMA-11 and that of the SMA-12 may be 1, and they may make supplementary displacement. Further, the recovering speed and the deforming speed of the SMA depend on the ambient temperature. Therefore, the pulse-generating section P is provided with temperature sensor TS capable of detecting ambient temperature so that an influence of the ambient temperature may be taken into consideration for coping.

Figure 17:
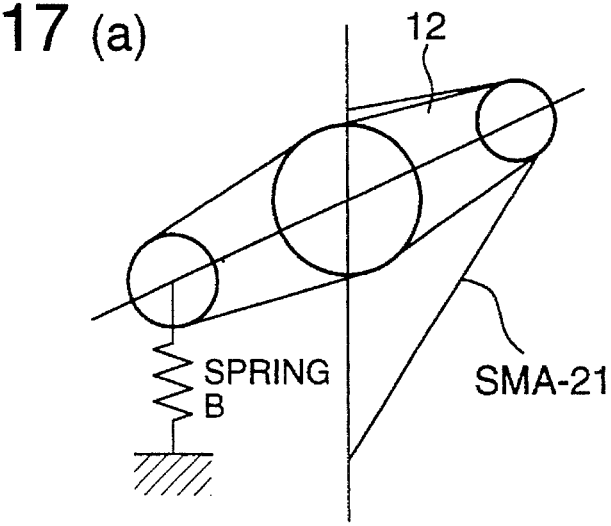
FIGS. 17(a)–17(c) represent a driving circuit diagram wherein a lever of a stepless aperture-adjusting mechanism is driven by a driving member composed of an SMA (a shape memory alloy) fine wire and a spring.
Figure 17:
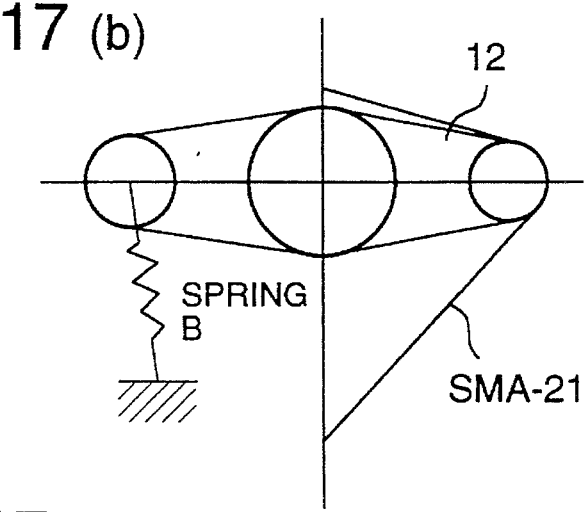
Figure 17:
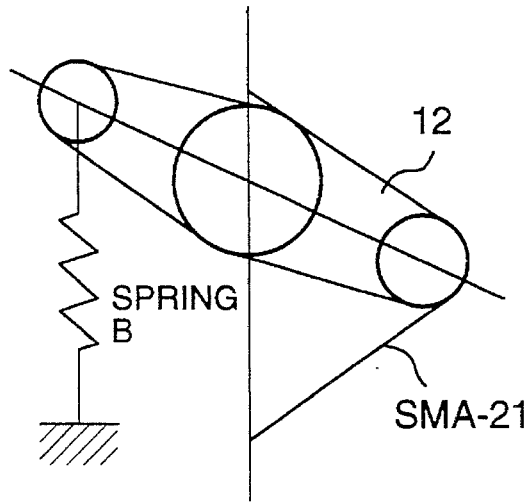
Figure 18:
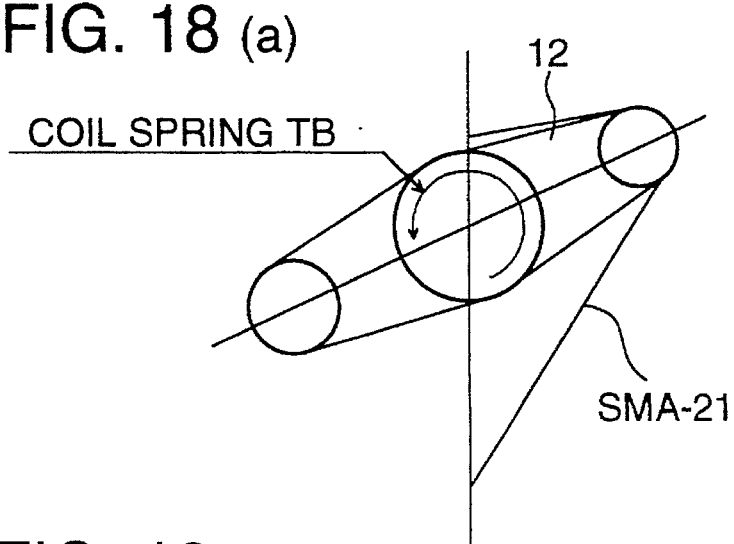
FIGS. 18(a)–18(c) represent a driving circuit diagram wherein a lever of a stepless aperture-adjusting mechanism is driven by a driving member composed of an SMA (a shape memory alloy) fine wire and a coil spring.
Figure 18:
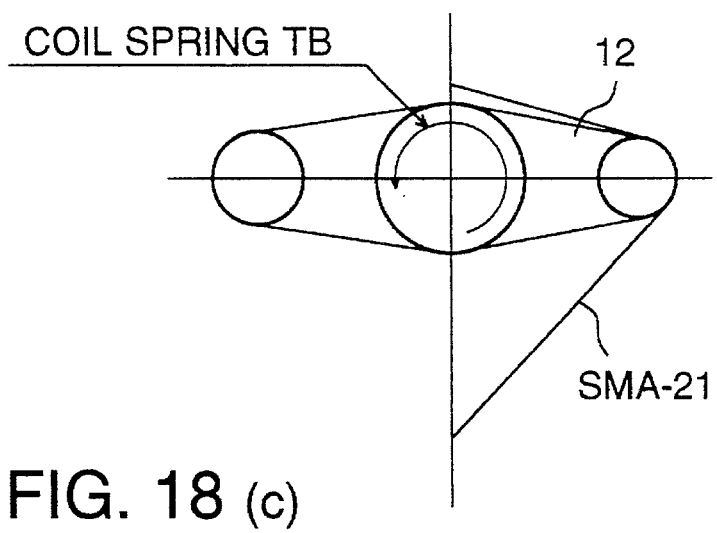
Figure 18:
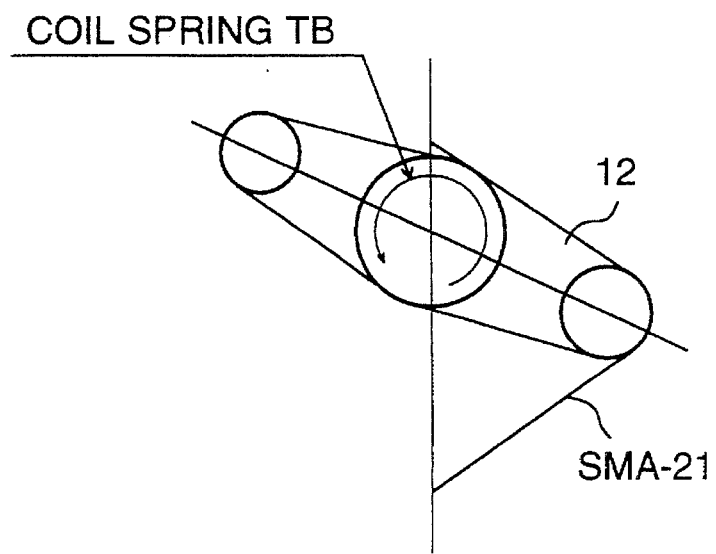

As a further application example, FIG. 17 shows an example wherein one of two SMA fine wires is eliminated to be replaced with spring B21. In this example, under the state wherein SMA-21 is not heated (SMA-21 is the longest in FIG. 17-a), the left end of the lever 12 is urged down to the lowest position by spring B21. Now, when the SMA-21 is heated, the SMA-21 starts recovering (shrinking) against the spring B21 and advances to the state shown in FIG. 17-c through FIG. 17-b. As a driving circuit in this case, there may be used driving circuit C2 in FIG. 16 from which the section for electrifying SMA shown below the broken lines in FIG. 16 is eliminated. In this case, the SMA-21 controls an aperture blade while the SMA-21 and spring B21 pull against each other. Incidentally, the spring B21 is not limited to this, but it may be a coil spring wound round a rotary shaft of the lever 12 to provide urging force for rotation as shown in FIG. 18.

Due to the constitution mentioned above, a stepless aperture-adjusting mechanism which is extremely low-priced has been realized.

Incidentally, the example described above is only one example of applications of the invention, and the invention can naturally be applied also to all image-related equipment including a video camera and a copying machine as well as various optical equipment, in addition to a camera.

Next, there will be explained the second example wherein the characteristics of an SMA driving member are applied to 2-step focusing control.

Figure 19:
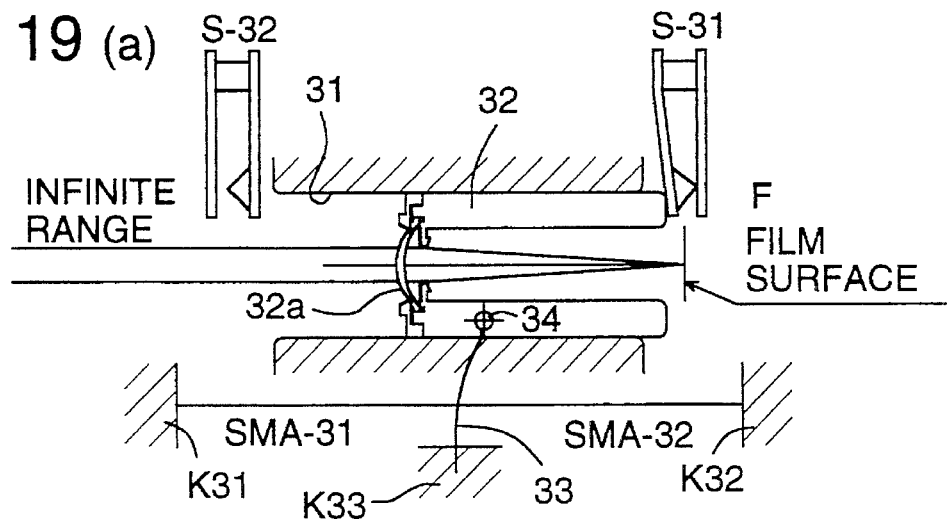
FIGS. 19(a)–19(c) represent a structural diagram of a 2-step focusing mechanism equipped with a driving member composed of an SMA (a shape memory alloy) fine wire.
Figure 19:
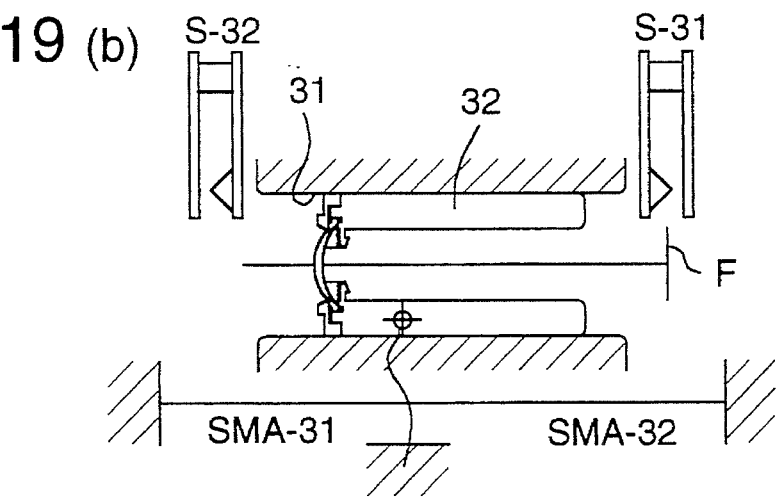
Figure 19:
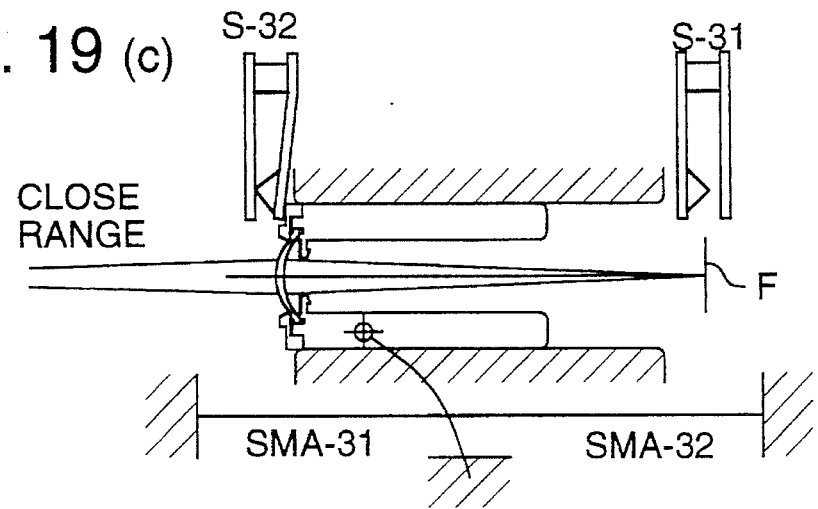
Figure 20:
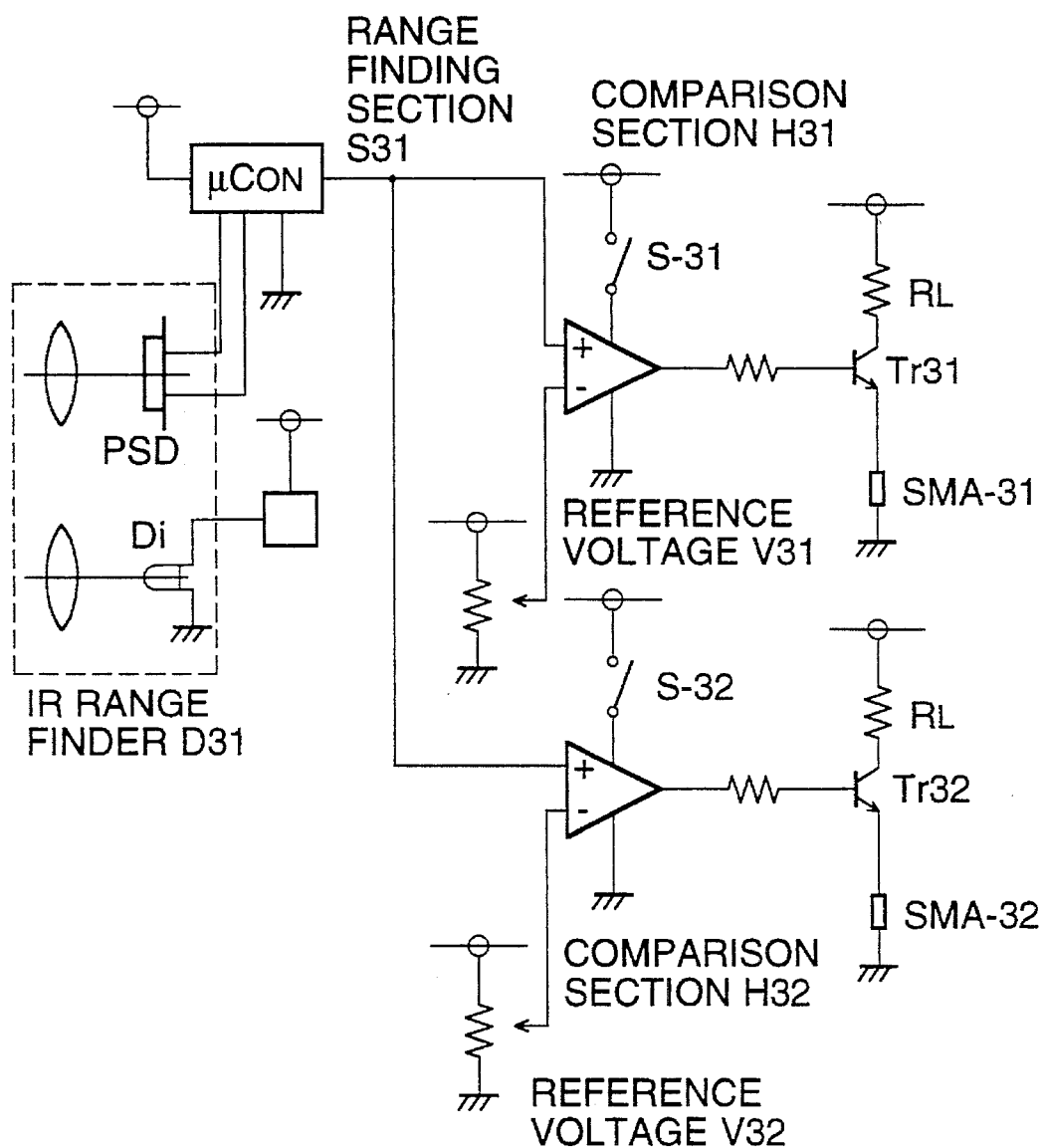
FIG. 20 is a driving circuit diagram of a 2-step focusing mechanism equipped with a driving member composed of an SMA (a shape memory alloy) fine wire.

FIG. 19 is a sectional view showing the vicinity of a picture-taking lens of a camera in the second example, and FIG. 20 is a driving circuit therefor. In the figure, lens barrel 32 is supported on outer frame 31 so that the lens barrel 32 can move from side to side. In the lens barrel 32, there is housed lens system 32a. An upper end of leaf spring 33 whose lower end is supported on fixing section K33 is engaged rotatably with engagement pin 34 fixed on the lens barrel 32.

In FIG. 19-a, lens barrel 32 is urged by leaf spring 33 to be positioned at the right side. Two SMA fine wires SMA-31 and SMA-32 are attached to the leaf spring 33 in a way that both fine wires pull the leaf spring 33 toward its both sides as shown in the figure, and ends of the aforementioned two SMA fine wires are affixed respectively on fixing sections K31 and K32 are attached respectively to both moving ends of lens barrel 32 so that the leaf switches may be turned on and off being coupled with the lens barrel 32 as shown in the figure.

On the other hand, driving circuit C3 that drives SMA-31 and SMA-32 compares an output from range-finding section M31 employing an IR (infrared rays) range-finder with reference voltage V31 and V32, and a difference resulted from the comparison turns on and off two transistor switches Tr31 and Tr32 for driving two SMA-31 and SMA-32, which represents an extremely simple circuit.

In FIG. 19 again, FIG. 19-a shows that lens barrel 32 is urged by leaf spring 33 to be at the right side end, and thereby an object in an infinity position is in focus [a range form an infinity position to a position of a limited distance (about 5 m in F-number on an ordinary camera) can be a focused range of the infinity position in this case, because a camera lens has the depth of a focus]. Under this state, S-31 is turned on and S-32 is turned off. Therefore, SMA-32 electrified by transistor Tr32 can be ignored. Next, when the object is changed to move toward a close range side beyond the range of the depth of a focus mentioned above, an output from range-finding section M31 exceeds reference voltage V31, and transistor Tr31 is turned on by output from comparing section H31, thus electricity flows through SMA-31. Thereby, the SMA-31 is heated and starts shrinking.

In this case, lens barrel 32 is pulled toward the left by leaf spring 33 because SMA-32 is in a quite free state (FIG. 19-b). Then, when engagement pin 34 comes in the vicinity of the position just over fixing section 33, switch S-31 is also turned off and SMA-31 is also caused to be free a accordingly. This state, however, is one that is extremely unstable wherein the leaf spring 33 is subjected to S-shaped deformation. Therefore, it either returns to its state shown in FIG. 19-a while seeking its stable point, or it goes to the left directly.

In this case, when the position of switch S-31 is set so that the switch S-31 may be turned off after leaf spring 33 gets in the condition to go to the left without fail, the state shown in FIG. 19-C is brought. Even in this case, transistor Tr31 is still under the condition of ON, but switch S-3 is already on the state of OFF. Therefore, electricity does not keep flowing.

On the other hand, though switch S-32 is on the state of ON, transistor Tr32 is not turned off because reference voltage 2 is set to the state wherein no output is generated from comparing section H32 by output from range-finding section M31. Therefore, no electricity flows also through switch S-32. However, when the object enters the infinity position (the focused range described above) again, an output is generated from comparing section 2, transistor Tr32, this time, is turned on, electricity flows through SMA-2, and the state returns to one shown in FIG. 19-a through the same mechanism as in the foregoing and in the sequence opposite to that in the foregoing.

Figure 9:
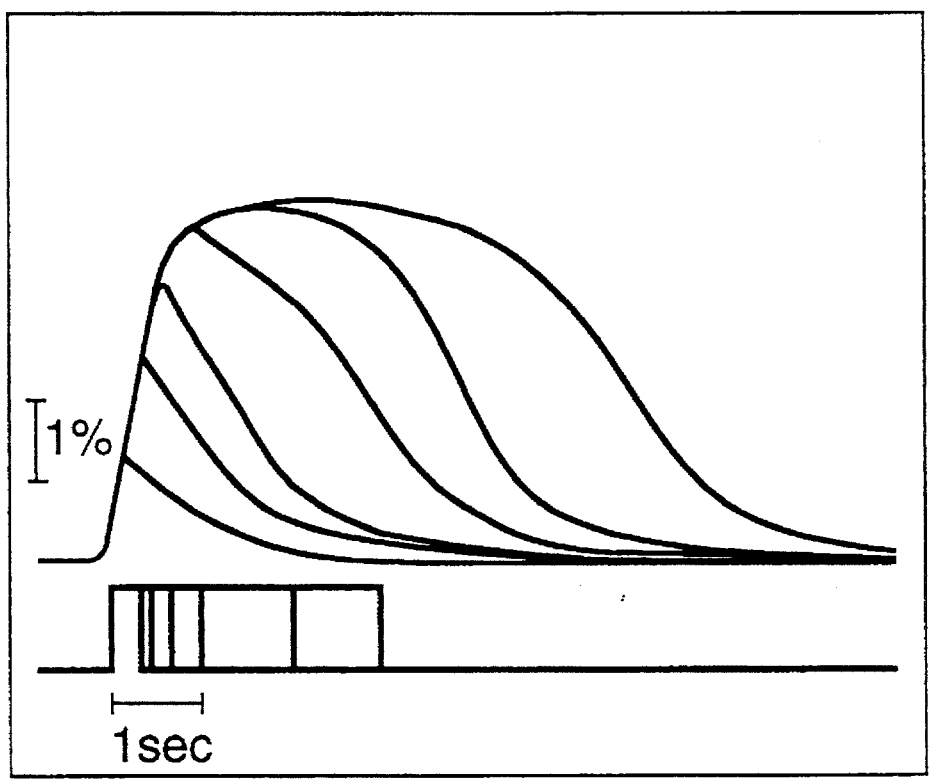
FIG. 9 is a characteristic diagram showing recovery and deformation of SMA for each of 6 types of ON times for a flowing current.

In the mechanism mentioned above, electrifying time for an SMA driving member is just a fraction of a second when a lens barrel starts moving, and it is not necessary to electrify during the period other than the electrifying time, and thereby there is no cause for concern about power consumption. For that reason, a value of electric current can be established with only the recovering speed shown in FIG. 2 taken into consideration. Necessary amount of recovery, on the other hand, can be established with ON time for electrifying as shown in FIG. 3. The amount of recovery can also be determined naturally only through the establishment of positions of switches S-31 and S-32, because the recovery speed is constant once a value of electric current has been determined as shown in FIG. 9.

Namely, when the aforesaid mechanism and driving circuit are used, an object distance changing the position of a lens barrel can be set independently at both an infinite range side and a close range side, electrifying time for an SMA driving member is just an instant, and the recovery speed can be selected freely. In addition, electrifying time can be set independently only be the positions of switches S-31 and S-32, a driving source is only an SMA fine wire that is exceedingly low-priced compared with a motor, and its driving circuit is extremely simple, which is different from a conventional mechanism for moving a lens barrel.

Incidentally, though energy efficiency of an SMA is low compared with a motor, operation time of the SMA is extremely short. Therefore, the energy efficiency of an SMA does not cause any problem.

Through the constitution mentioned above, an extremely low-priced 2-step focusing mechanism has been realized.

Incidentally, the example described above is only one example of applications of the invention, and the invention can naturally be applied also to all image-related equipment including a video camera and a copying machine as well as various optical equipment, in addition to a camera Next, there will be explained an example that is an improved one of the second example wherein an SMA is applied to stepless focus control, utilizing its characteristics as a driving member, referring to a mechanism structural diagram in FIG. 21 and a structural diagram of a driving circuit in FIG. 21.

Figure 21:
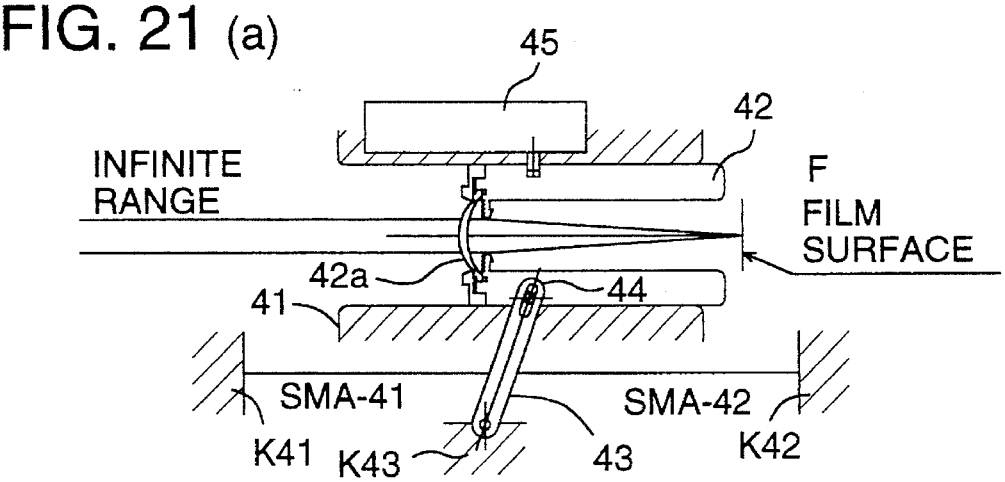
FIGS. 21(a)–21(c) represent a structural diagram of a stepless focusing mechanism equipped with a driving member composed of an SMA (a shape memory alloy) fine wire.
Figure 21:
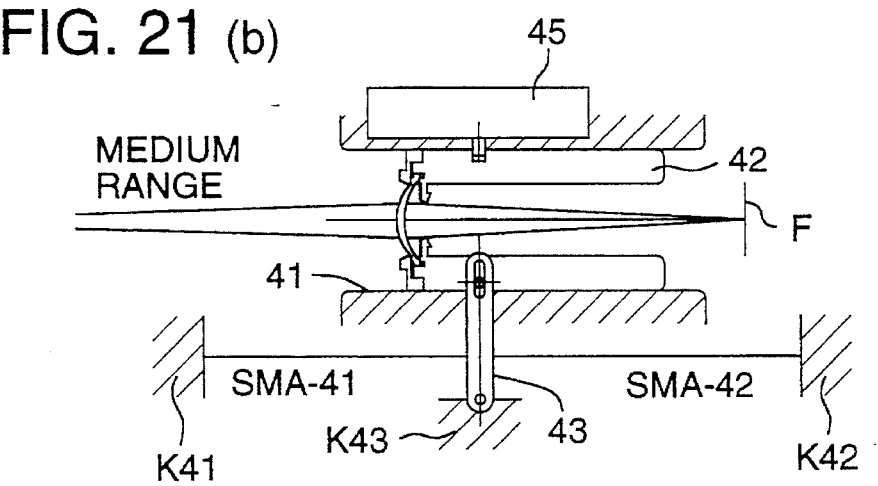
Figure 21:
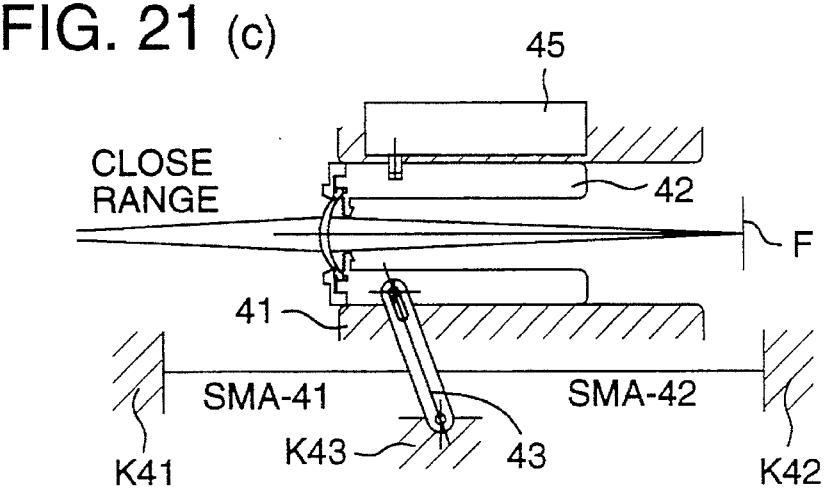

First, as shown in FIG. 21-a, lens barrel 42 is held in outer frame 41 of a camera in a manner that the lens barrel can move from side to side. In the lens barrel 42, there is housed lens system 42a. A lower end of lever 43 is supported rotatably in fixing section K43, and engagement pin 44 affixed on the lens barrel 42 is engaged with cam groove 43a (elongated hole) formed on the upper half portion of the lever 43. To the lever 43, driving members SMA-41 and SMA-42 both composed of two SMA fine wires are attached as shown in the figure in a manner that the lever 43 is pulled toward both sides by the driving members, and ends of the SMA fine wires are affixed respectively on fixing sections K41 and K42.

FIG. 21-a shows the state wherein driving member SMA-42 is shortest and driving member SMA-41 is longest. In this case, when the driving member SMA-41 is electrified and heated, it starts recovering (shrinking) and it reaches the state in FIG. 21-c through the state in FIG. 21-b. Namely, lens barrel 42 moves through engagement pin 44 in cam groove 43a, in accordance with rotation of lever 43, thus the focusing position of lens system 42a for film plane F is moved.

On the contrary, when the SMA-42 is electrified and heated from the state in FIG. 21-c, the driving member SMA-42 starts recovering and reaches the state in FIG. 21-a through the state in FIG. 21-b.

Namely, the position of lever 44 is determined by the balance in pulling each other of two SMA fine wires, and the state between that in FIG. 21-a and that in FIG. 21-c, namely between an infinity distance and a close range can be set freely. Due to a driving member composed of an SMA, it is possible to rotate lever 43 freely without using a motor, and it is therefore possible to move lens barrel 42, namely lens system 42a freely.

Incidentally, in the present example, there is provided encoder 45 so that it may be coupled with lens barrel 42 to detect the position of the lens barrel 42.

A driving circuit that drives the driving members SMA-41 and SMA-42 changes DUTY ratio of pulses from pulse-generating unit P41 by means of output from range-finding section M41 employing an IR range-finding unit, and drives the driving members SMA-41 and SMA-42 through the pulse control described above. In this case, since the driving member SMA-1 and driving member SMA-2 are opposite in terms of direction concerning recovery and deformation, one of two inputs to transistors electrifying from pulse-generating unit P41 to driving members SMA-41 and SMA-42 is reversed by an inverter.

Incidentally, the recovering speed and the deforming speed of an SMA depend on ambient temperature. To take that influence into consideration, the pulse-generating unit P41 is provided also with a temperature sensor that detects ambient temperature.

Figure 23:
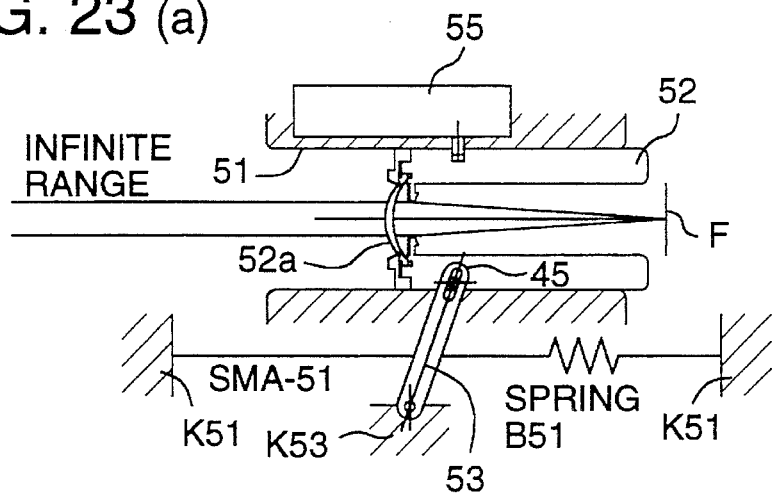
FIGS. 23(a)–23(c) represent a structural diagram of a stepless focusing mechanism equipped with a driving member composed of an SMA (a shape memory alloy) fine wire and a spring.
Figure 23:
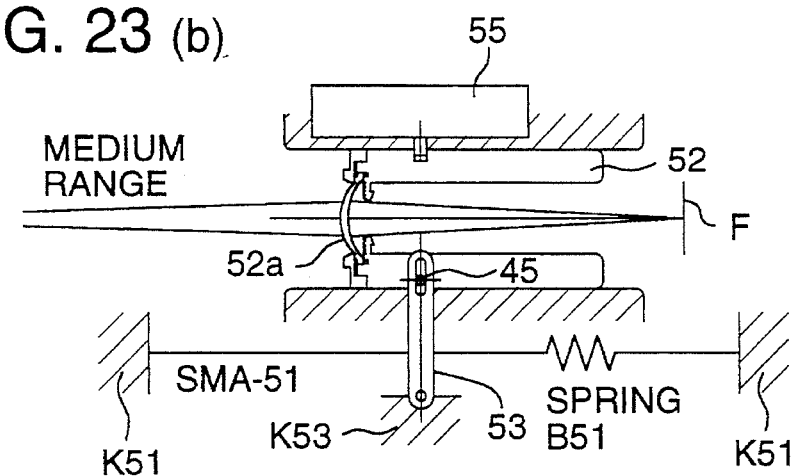
Figure 23:
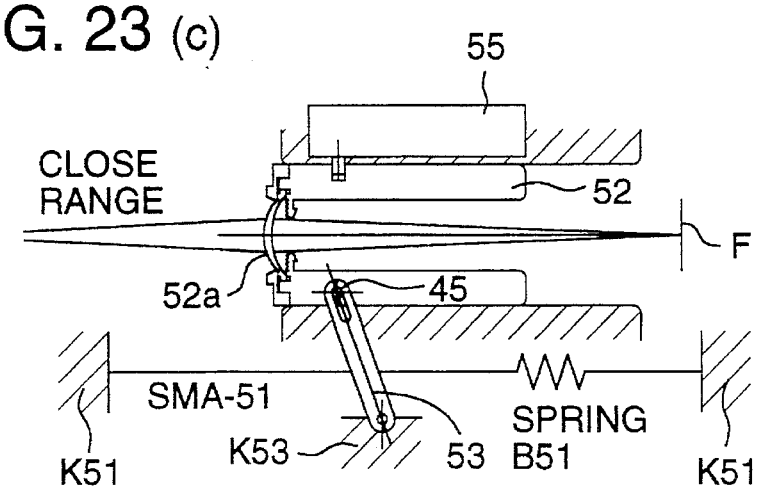

Next, FIG. 23 shows an example wherein one of two driving members SMA in the aforementioned focusing mechanism is replaced with spring B51.

Figure 22:
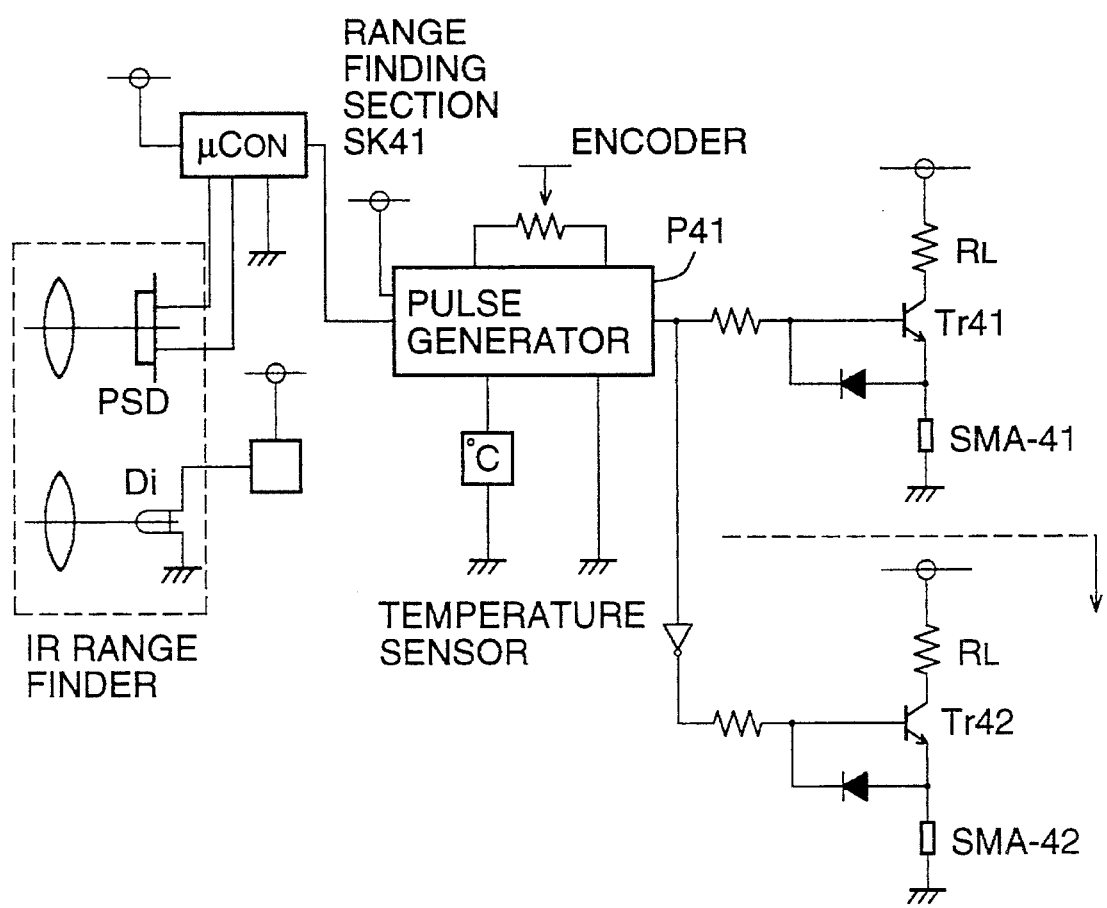
FIG. 22 is a driving circuit diagram of a stepless focusing mechanism equipped with a driving member composed of an SHA (a shape memory alloy) fine wire.

FIG. 23-a shows driving member SMA-51 that is not heated, and lever 53 is pulled by spring B51 and lens barrel 52 is pulled to the right end, while driving member SMA-51 is in its longest state. In this case, when the driving member 51 is heated, it starts recovering, thereby the lens barrel 52 is moved through engagement pin 54 in cam groove 53a in accordance with rotation of lever 53 as in the previous example, thus a focused position of lens system 52a for film plane F is moved, and it goes to the in FIG. 23-c through the state in FIG. 21-b. When electrifying is stopped at this moment, the lever 53 is pulled by spring B51 and returns to its initial state (wide angle state) in FIG. 23-a. As a driving circuit, an electrifying portion of SMA shown with broken lines may be eliminated in FIG. 22.

In this case, the position of the lens barrel is controlled by the balance between an SMA fine wire and a spring both of which pull each other.

Due to the constitution mentioned above, a stepless focusing unit which is extremely low-priced has been realized.

Incidentally, the example described above is only one example of applications of the invention, and the invention can naturally be applied also to all image-related equipment including a video camera and a copying machine as well as various optical equipment, in addition to a camera.

Next, a third example wherein characteristics of an SMA as a driving member are utilized in a 2-step zooming control mechanism will be explained, referring to a structural diagram in FIG. 24 and a driving circuit in FIG. 25.

First, as shown in FIG. 24-a, lens barrel 62 and lens barrel 63 are held in outer frame 61 of a camera in a manner that the lens barrels can move from side to side. Lens system 62a is housed in the lens barrel 62, and lens system 63a is housed in the lens barrel 63. A lower end of lever 64 is supported rotatably in fixing section K63, a cam groove (elongated hole) formed on the central portion of the lever 64 is engaged with engagement pin 65 fixed on the lens barrel 62, and a cam groove (elongated hole) formed on the upper portion of the lever 64 is engaged with engagement pin 66 affixed on the lens barrel 63. On the lever 64, there are attached driving member SMA-61 and spring B61 in a manner that they pull the lever 64 toward both sides, and other ends of the driving member SMA-61 and the spring B61 are affixed respectively on fixing sections K61 and K62.

FIG. 24-a shows the state wherein the spring B61 is shortest and the driving member SMA-61 is longest. In this case, when the driving member SMA-61 is electrified and heated, it starts recovering to rotate the lever 64 and thereby to change the relation of relative positions of the lens barrel 62 and the lens barrel 63 for zooming, thus the state goes to that in FIG. 24-c through the state in FIG. 24b. Incidentally, the lens system in the example is a zoom lens system composed of one convex and one concave lens, and FIG. 24-a shows a wide angle position, while FIG. 24-c shows a telescopic position.

Figure 25:
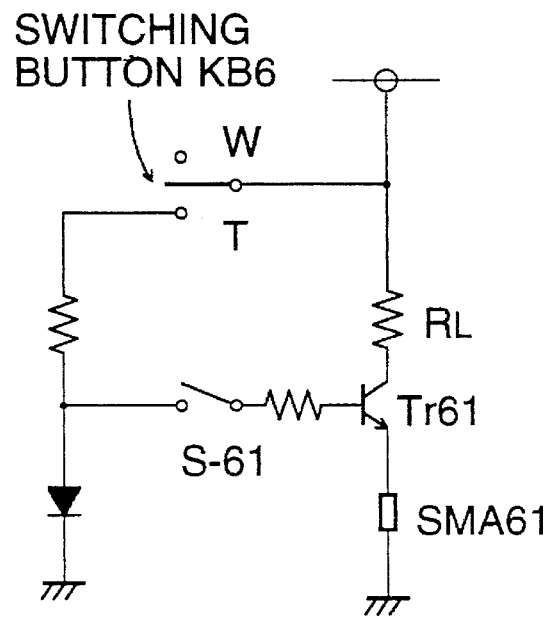
FIG. 25 represents a driving circuit diagram of a 2-step zooming mechanism equipped with a driving member composed of an SMA (a shape memory alloy) fine wire.

A driving circuit that drives a zooming mechanism having the aforementioned constitution is a fixed current driving circuit which is extremely simple as shown in FIG. 25. When switching button KB6 is positioned on the W (wide angle) side, driving member SMA-61 is not electrified at all, and lever 64 is pulled by spring B61 to be stable in the state of wide angle shown in FIG. 24-a. Under this state, when the switching button KB6 is switched to the T (telescopic) side, transistor Tr61 is turned on and driving member SMA-61 is electrified.

Then, the SMA-61 starts recovering to move the lens barrels 62 and 63 through the lever 64 as in the foregoing, and the state goes to one in FIG. 24-c through FIG. 24-b. Then, the lens barrel 62 pushes a lever of switch S-61 to turn it off, thus electricity flowing through the driving member SMA-61 is stopped. Then, the driving member SMA-61 starts deforming again, and immediately after the start of deformation, switch S-61 is turned on and the driving member SMA-61 immediately starts recovering. In short, as long as the switching button KB6 is on the T side, the lever 64 vibrates faintly with the lens barrels 62 and 63 positioned extremely close to the contact point of switch S-61 for the telescopic position. Since amplitude of the faint vibration is small, the zoom lens system is practically stable in the telescopic state.

Figure 26:
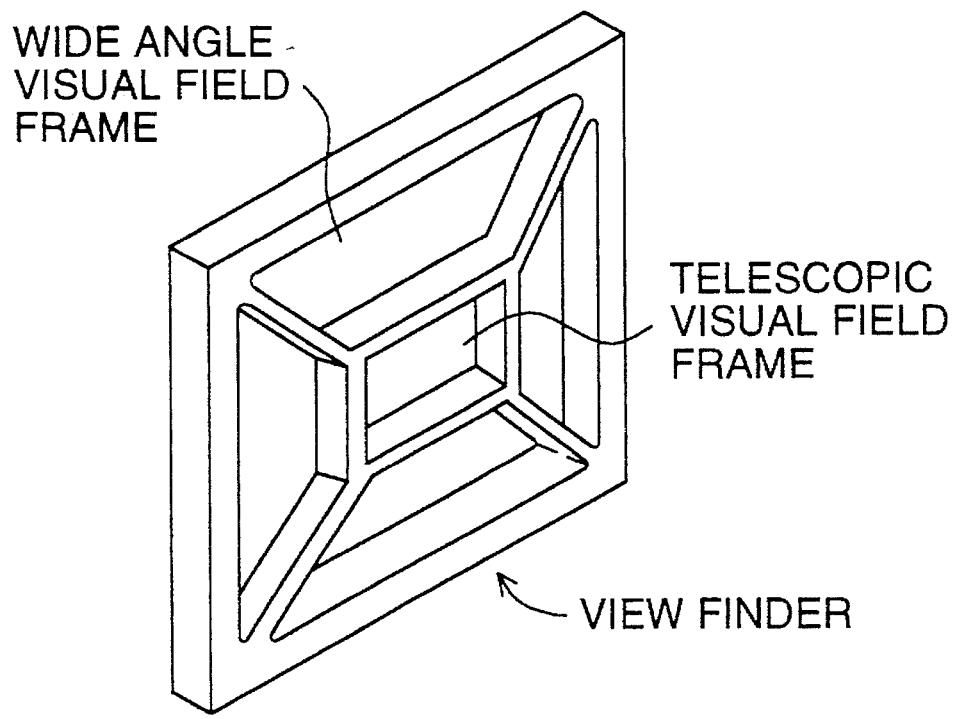
FIG. 26 represents a viewfinder structural diagram of a 2-step zooming mechanism equipped with a driving member composed of an SMA (a shape memory alloy) fine wire.

In a zoom lens, a photographed range varies depending on a zooming position. Therefore, a viewfinder visual field for determining a photographing range should also be changed accordingly. In the case of a double-focus as in the foregoing, when there is used a viewfinder having two visual field frames for one image plane as shown in FIG. 26, its constitution would be most simple and extremely advantageous in terms of cost.

Due to the constitution mentioned above, a 2-step zooming unit which is extremely low-priced has been realized.

A zooming mechanism and its driving circuit can naturally be applied widely not only to a camera but also to general image equipment including a video camera or the like, image forming apparatuses such as a copying machine or the like and various optical equipment.

Next, there will be explained an example that is an improved of the third example wherein characteristics of an SMA as a driving member are utilized in a stepless zooming control, referring to a structural diagram in FIG. 27 and its driving circuit in FIG. 28.

Figure 27:
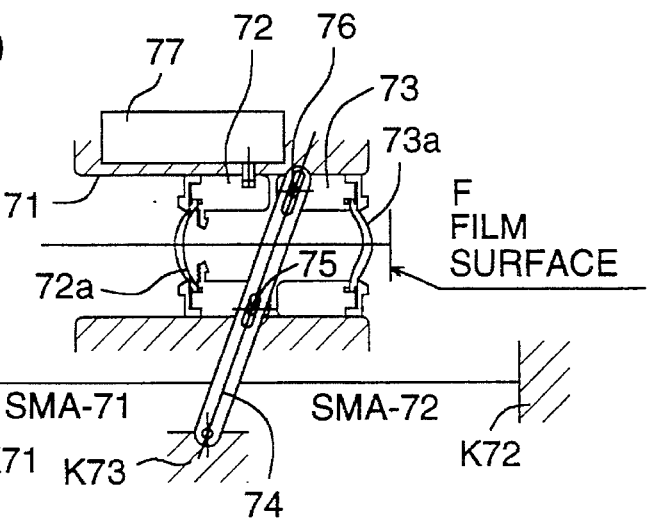
FIGS. 27(a)–27(c) represent a structural diagram of a continuous zooming mechanism equipped with a driving member composed of an SMA (a shape memory alloy) fine wire.
Figure 27:
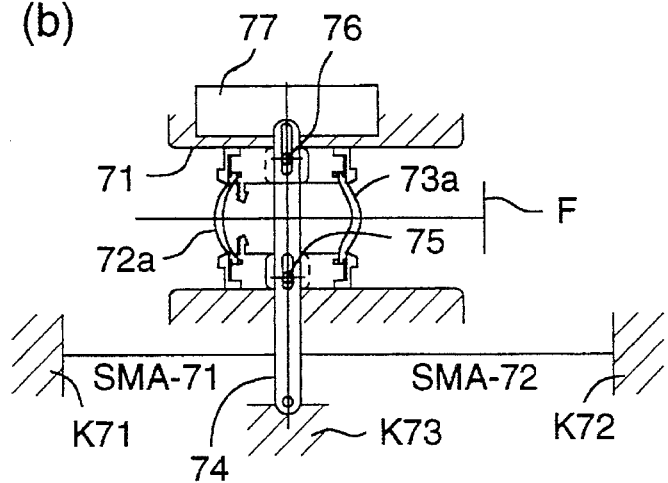
Figure 27:
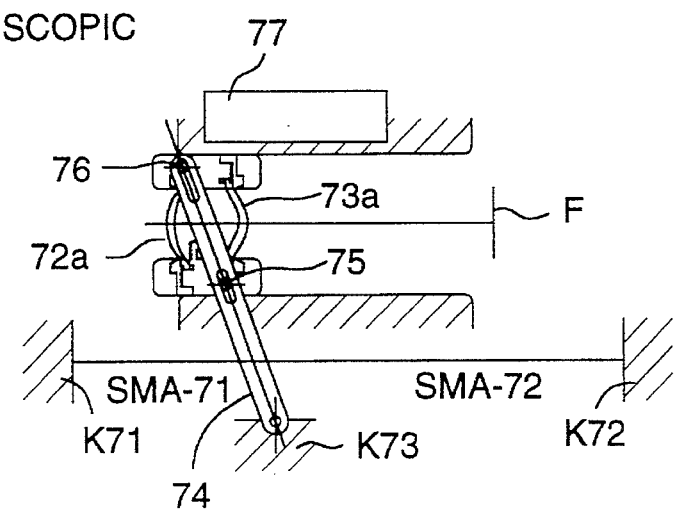
Figure 28:
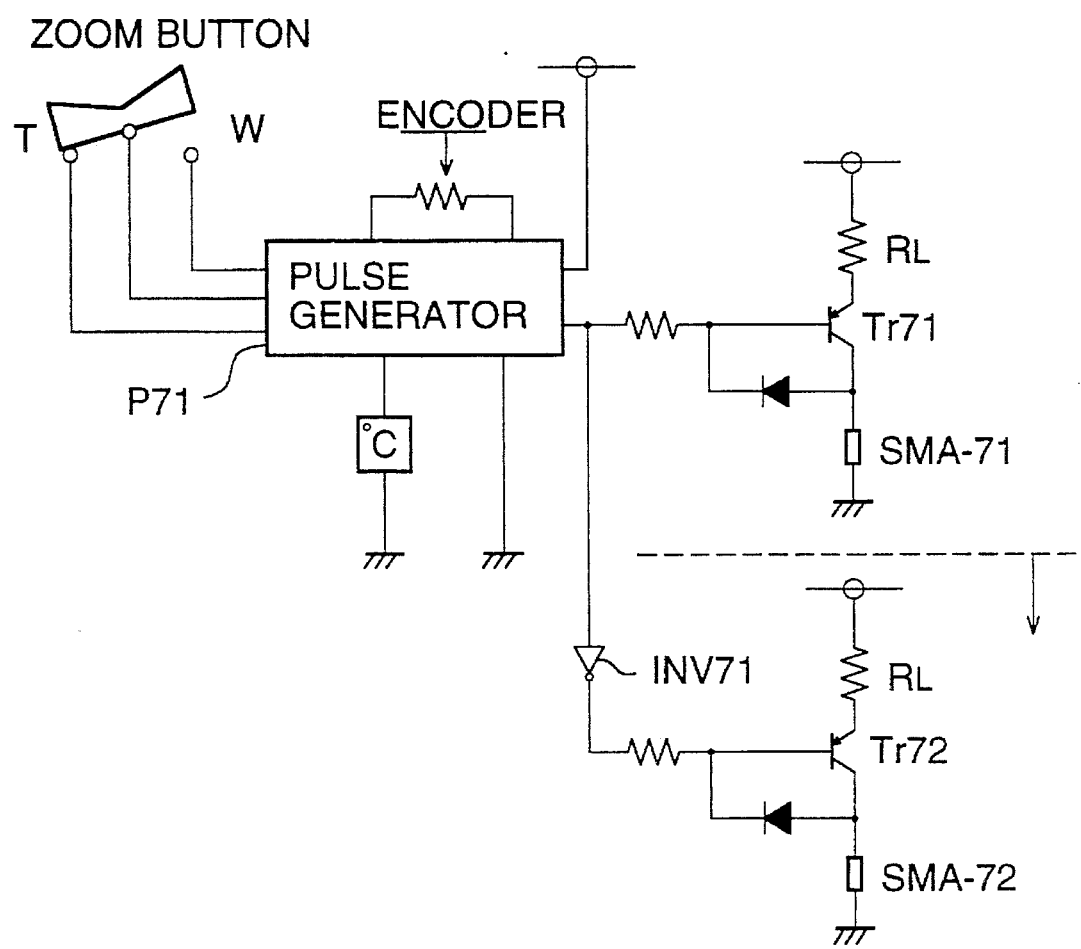
FIG. 28 represents a driving circuit diagram of a continuous zooming mechanism equipped with a driving member composed of an SMA (a shape memory alloy) fine wire.

First, as shown in FIG. 27-a, lens barrels 72 and 73 are held in outer frame 71 of a camera in a manner that the lens barrels can move from side to side. Lens system 72a is housed in the lens barrel 72 and lens system 73a is housed in the lens barrel 73. A lower end of lever 74 is supported rotatably in fixing section K73, and cam grooves (elongated holes) formed respectively on the upper portion and central portion are engaged respectively with engagement pin 75 affixed on the lens barrel 72 and engagement pin 6 affixed on the lens barrel 73.

Two driving members composed of SMA fine wires are attached on the lever 74 in a way that the driving members pull the lever 74 toward both sides, and the other end of each SMA fine wire is affixed on each of fixing sections 71 and 72. FIG. 24-*a* shows the state wherein driving member SMA-72 is shortest while driving member SMA-71 is longest. In this case, when the driving member SMA-71 is electrified and heated, it starts recovering (shrinking), and reaches the state in FIG. 27-*c* through in FIG. 27-*b*. In this case, lens barrels 72 and 73 are moved through lever 74, and their relative positional relation is changed.

When the driving member SMA-72 is electrified and heated under the state in FIG. 27-*c*, on the other hand, it starts recovering and each member coupled with it starts making displacement in the same mechanism as in the foregoing and in the opposite direction to reach the state in FIG. 27-*a* through FIG. 27-*b*, Namely, lever 74 is positioned due to the pull of SMA-71 or that of SMA-72 whichever is stronger so that any zooming position may be obtained. Incidentally, the lens system 72*a* in the example is composed of a zoom lens system consisting of the convex lens and one concave lens, and FIG. 27-*a* corresponds to a wide angle position, while FIG. 27-*c* corresponds to a telescopic position. Incidentally, encoder 77 that is coupled through pin 77*a* is provided on the lens barrel 72 as shown in the figure so that the position of the lens barrel 72 may be detected.

The driving circuit driving the SMA fine wires changes a DUTY ratio of pulses generated from pulse-generating unit P71, and it is an extremely simple pulse driving circuit which drives SMA-71 and SMA-72 through the aforesaid pulse driving.

In this case, since SMA-71 and SMA-72 are opposite in terms of direction concerning recovery and deformation, only one of inputs to transistor switch Tr 7 electrifying from pulse generating unit P71 to SMA-72 is reversed by inverter INV 71. Further, since recovering speed and deforming speed of an SMA depend on ambient temperature, the pulse-generating unit P71 is provided with a temperature sensor detecting ambient temperature, so that an influence of ambient temperature may be taken into consideration.

FIG. 29 shows an example wherein one of driving members SMA is eliminated to be replaced with spring B81.

FIG. 29-*a* shows a state wherein SMA-81 is not heated. and lens barrels 82 and 83 are forced to be at the right end by lever 84 that is urged by the spring 81 toward the right. The driving member SMA-81 is in its state wherein it is longest. In this case, when the driving member SMA-81 is heated, it starts recovering (shrinking) to move the lever 84 to the left, and reaches the state in FIG. 29-*c* through FIG. 29-*b*.

When stopping electrifying the SMA-81, the lever 84 is pulled by the spring B81 and returns to the state of a wide angle in FIG. 29-*a*. A driving circuit may be one shown in FIG. 28 from which a circuit encircled by broken lines which represents an electrifying section for SMA-72 is eliminated. In this case, the positions of lens barrels 82 and 83 are controlled through the balance between the pull of SMA-71 and that of spring B81.

In a zoom lens, a photographing range varies depending on a zooming position. Therefore, a visual field of a viewfinder should also be changed accordingly for determining a photographing range. When a visual field frame shown in FIG. 30 is used, it is possible to realize an extremely low-priced viewfinder which in which a visual field changes continuously.

Figure 30:
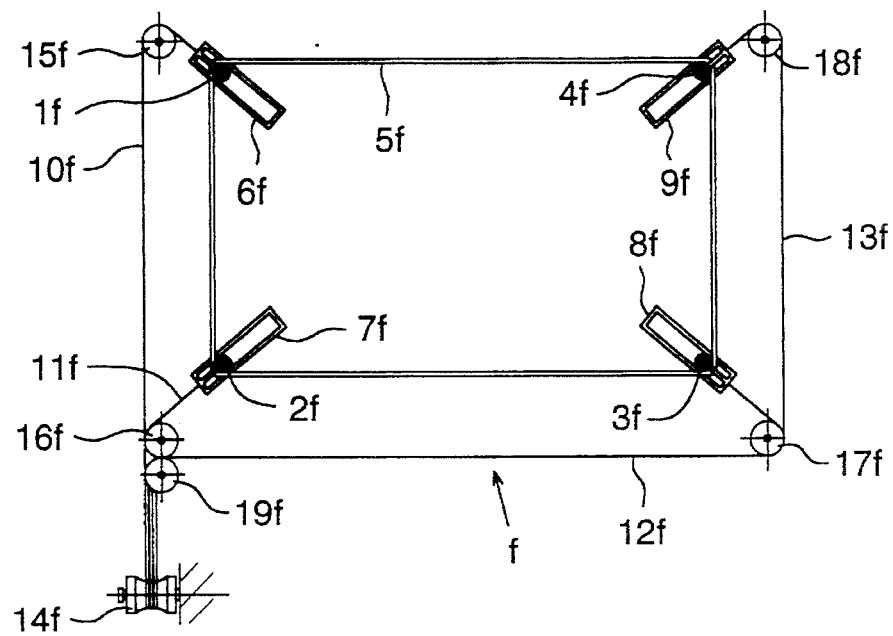
FIGS. 30(a)–30(b) represent a viewfinder structural diagram of a continuous zooming mechanism equipped with a driving member composed of an SMA (a shape memory alloy) fine wire.
Figure 30:
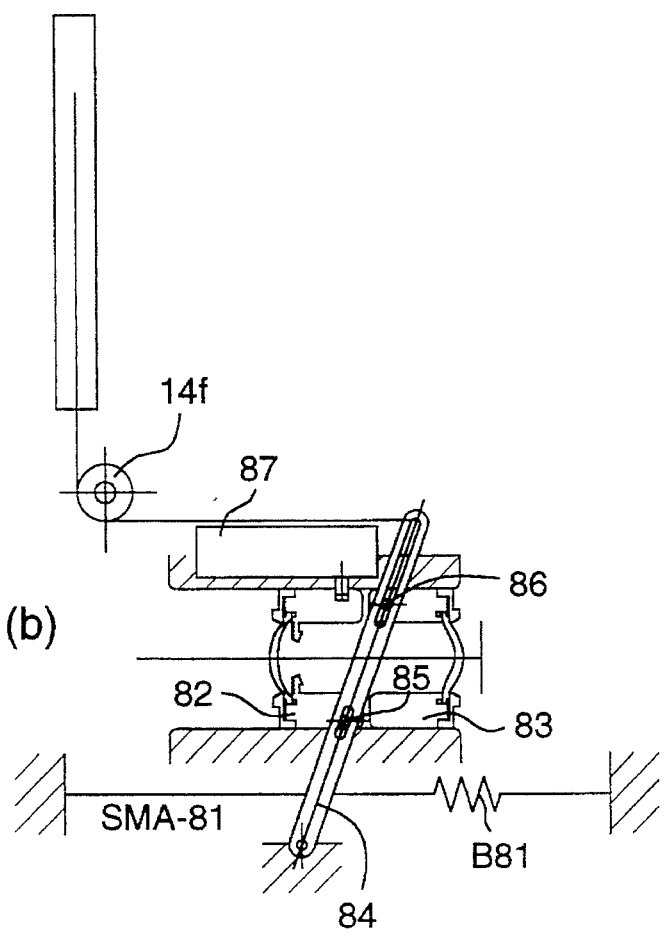

In FIG. 30(*a*), 4 engagement pins 1*f*–4*f* can move freely respectively along rails 6*f*–9*f* in the direction of a diagonal line of viewfinder f, and rubber band 5*f* that serves as a visual field frame is wound around the engagement pins 1*f*–4*f*. Further, engagement pins 1*f*–4*f* are connected respectively to wires 10*f*–13*f* each pulling each pin in the direction of a diagonal line. The wires are converged through pulleys 15*f*–18*f* and then are caused to make a turn by pulley 14*f* to be connected to the aforementioned lever 4*f* (30(*b*)).

FIG. 30(*a*) shows a state wherein wires 10*f*–13*f* are pulled most strongly to form the largest visual field frame. From this state, when the lens barrels 82 and 83 are moved to telescopic positions and lever 4*f* tilts to the left, wires 10*f*–13*f* are slackened and the rubber band 5*f* serving as a visual field frame shrinks due to its own elastic force. Namely, a visual field of viewfinder f narrows continuously.

The constitution of a viewfinder mentioned above makes it possible to realize an extremely low-priced visual field frame with which a photographer determines his camera angle, giving less burden to production cost.

Figure 31:
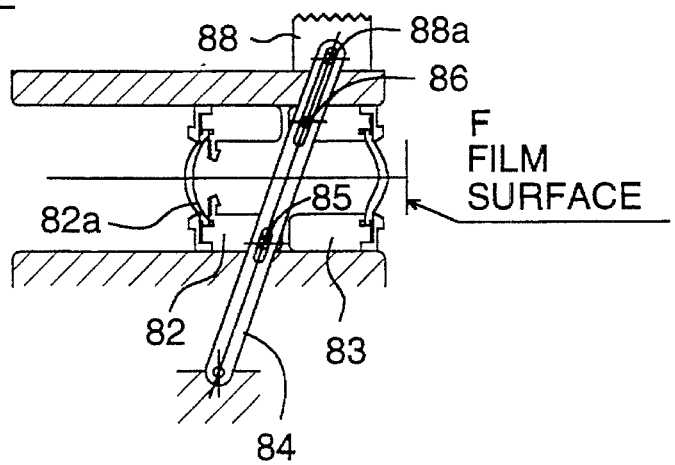
FIGS. 31(a)–31(c) represent a structural diagram of a continuous zooming mechanism wherein a driving member composed of an SMA(a shape memory alloy) fine wire is driven manually.
Figure 31:
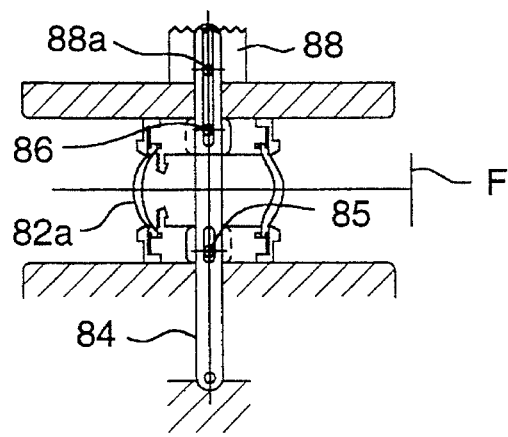
Figure 31:
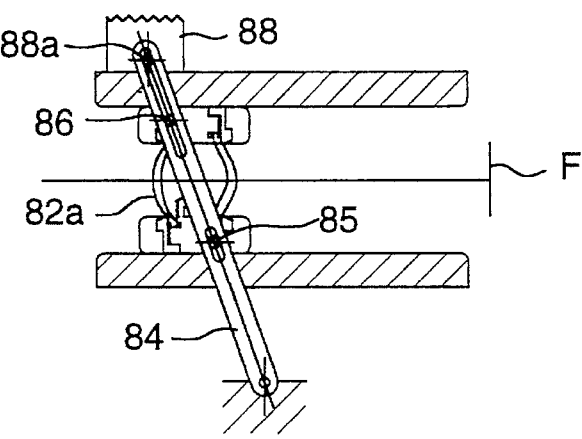

Incidentally, as another driving system for an actuator employing an SMA, there may be available the aforementioned mechanism wherein knob 8*f* is attached to the tip of lever 4*f* as shown in FIG. 31 and this knob is moved from side to side by a finger of a photographer for realizing manual zooming simply.

Due to the constitution mentioned above, an extremely low-priced stepless zooming unit has been realized.

The stepless zooming mechanism and its driving circuit can naturally be applied widely not only to a camera but also to general image equipment including a video camera or the like, image forming apparatuses such as a copying machine or the like and various optical equipment.

Figure 32:
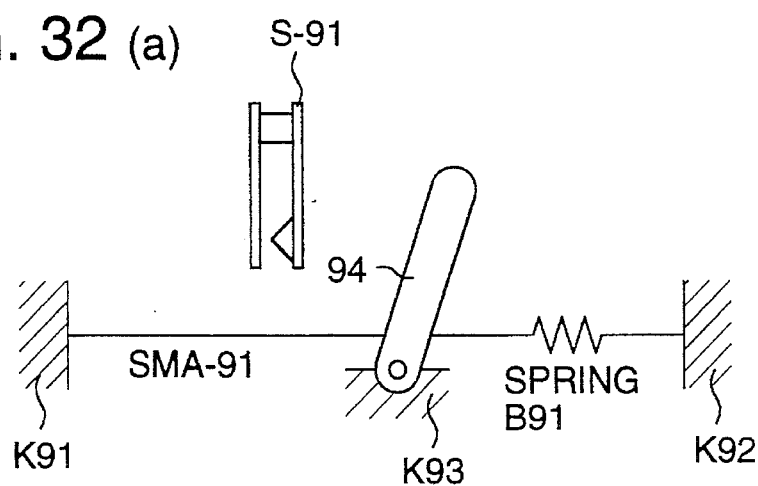
FIGS. 32(a)–32(c) represent a structural diagram showing a time-delay generating section of a selftimer mechanism equipped with a driving member composed of an SMA(a shape memory alloy) fine wire and a spring.
Figure 32:
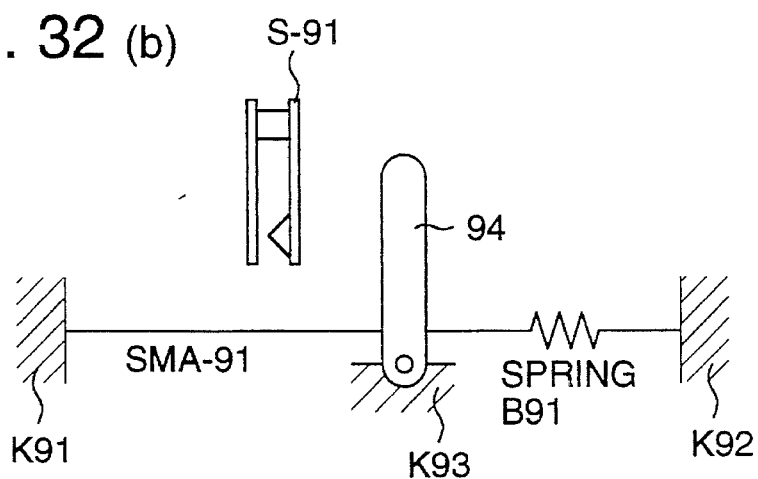
Figure 32:
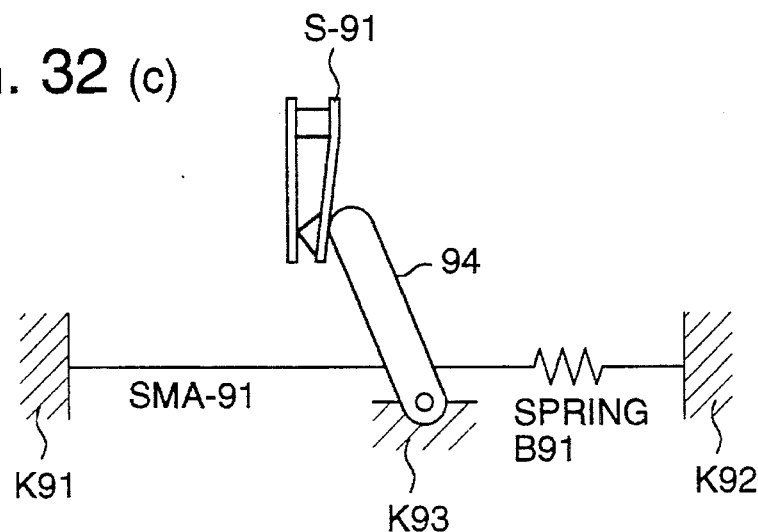
Figure 33:
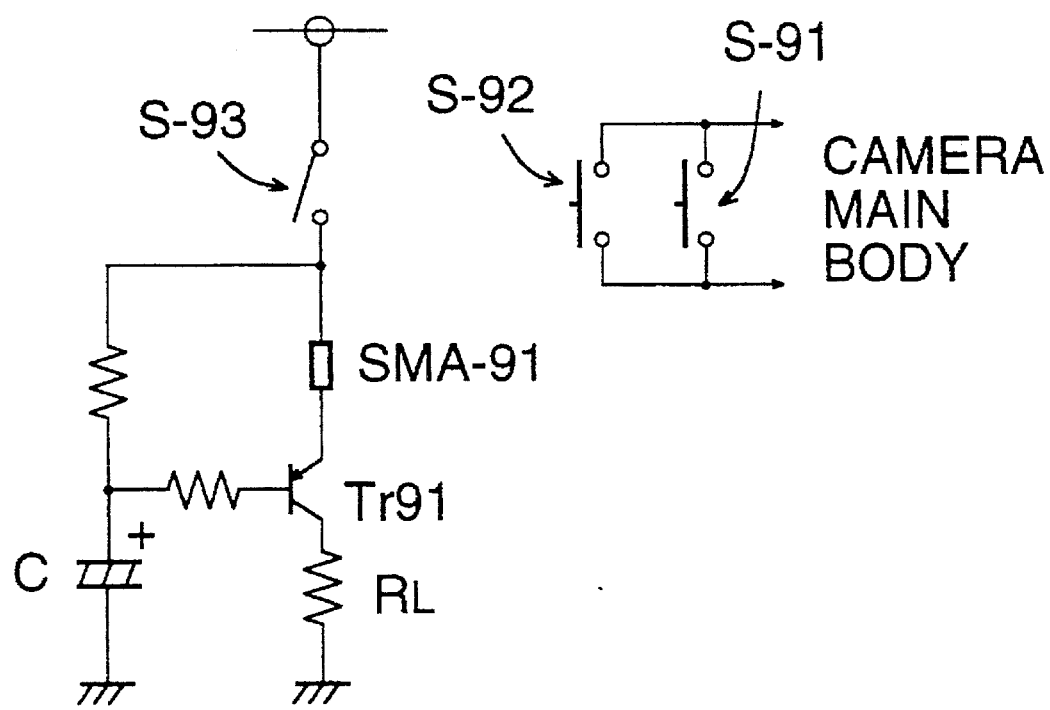
FIG. 33 represents a driving circuit of a selftimer mechanism equipped with a driving member composed of an SMA(a shape memory alloy) fine wire and a spring.

Next, a fourth example wherein characteristics of an SMA as a driving member are utilized in selftimer control will be explained as follows, referring to FIG. 32 showing a structural diagram and FIG. 33 showing a driving circuit therefor.

To lever 94 whose lower end is supported rotatably on fixing section K 83, there are attached driving member SMA-91 and spring B91 so that the lever 94 is pulled to both sides as shown in the figure, and other end of the SMA-91 is affixed on fixing section K91 while other end of the spring B91 is affixed on fixing section K92.

FIG. 32-*a* shows a state wherein spring B91 is shortest and driving member SMA-91 is longest. Under this condition, when the SMA-91 is electrified and heated, it starts recovering and reaches the state in FIG. 32-*c* through FIG. 32*b*. Leaf switch S-91, on the other hand, is installed so that it may be turned on only when the driving member SMA-91 is electrified.

On a driving circuit diagram in FIG. 33, a shutter button is coupled with switch S-92 and when the switch S-92 is pressed to close the circuit, a shutter (not shown) is operated.

On the other hand, a shutter button to be used when a selftimer is used is coupled with a combination of switch S-93 and switch S-91 provided that the switch S-91 is constantly OFF under the ordinary state as shown in FIG. 32-*a*.

When switch S-93 is turned on, electricity flows through driving member SMA-91 and it starts recovering (shrinking). However, it does not complete its recovery promptly and it goes to the state in FIG. 32(*c*) through FIG. 32(*b*), being delayed to a certain extent. This delay time can be used as a selftimer. In the stage in FIG. 32(*b*), switch S-91 is OFF and therefore a shutter is not operated. Then, electricity keeps flowing through the driving member SMA-91 until capacitor C has been charged. Only after the state reaches one shown in FIG. 32(*c*), the switch S-91 is turned on to operate a shutter.

When voltage of capacitor C is elevated and transistor Tr 1 is turned off, electricity flowing through the driving member SMA-1 is cut and the driving member SMA-91 starts deforming.

The time of a selftimer (deformation time of SMA-91) depends on spontaneous heat radiation time determined by a difference between ambient temperature and the driving member SMA-91, and it is therefore advantageous to make the temperature difference between ambient temperature and the driving member SMA-91 constant roughly at all times by using a compensating circuit employing an element that is sensitive to ambient temperature.

Due to the constitution mentioned above, a camera equipped with an extremely low-priced selftimer mechanism has been realized.

Incidentally, the selftimer mechanism and the driving circuit therefor can naturally be applied widely not only to a camera but also to general image equipment including a video camera or the like, image forming apparatuses such as a copying machine or the like and various optical equipment.

Figure 34:
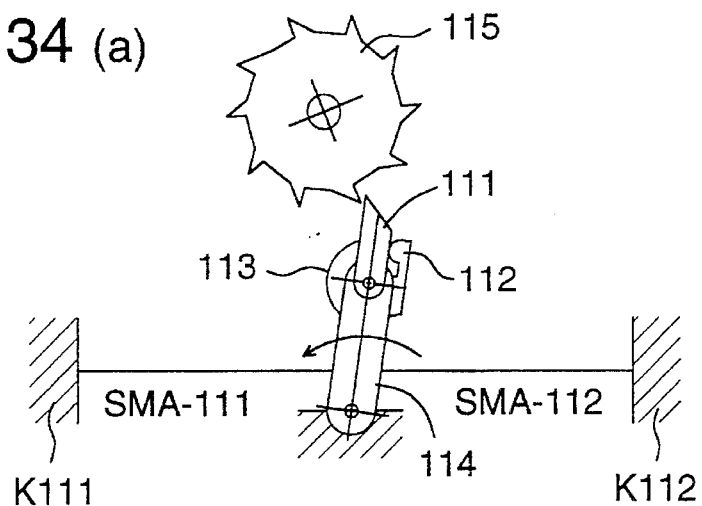
FIGS. 34(a)–34(c) represent a theoretical structural diagram of an automatic film-winding mechanism provided with a driving member composed of an SMA(a shape memory alloy).
Figure 34:
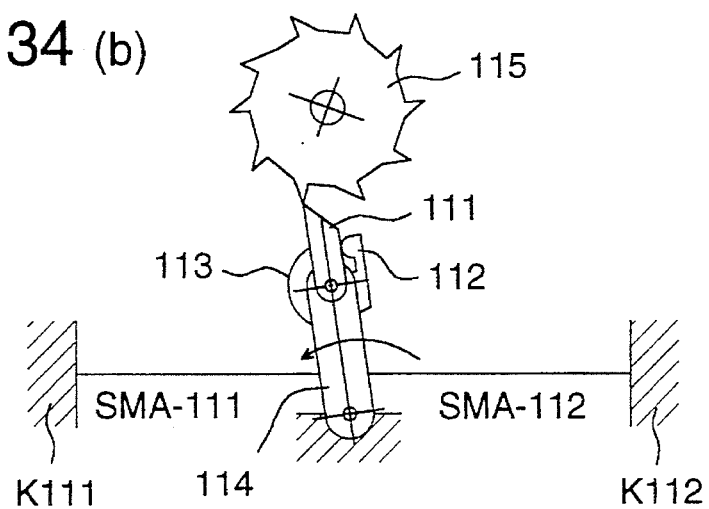
Figure 34:
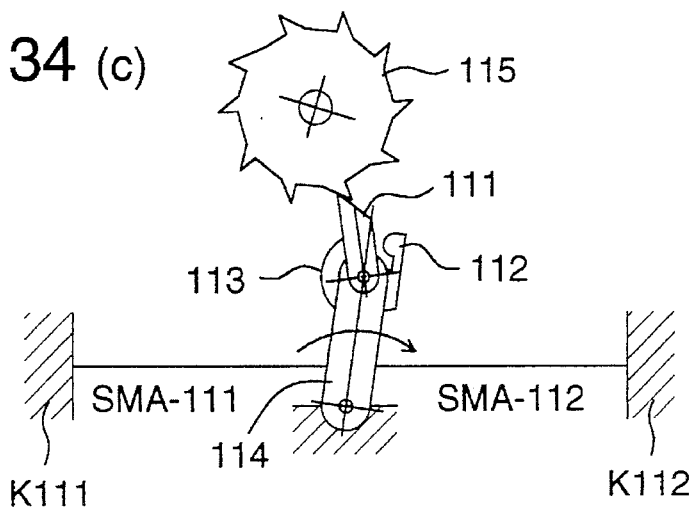
Figure 35:
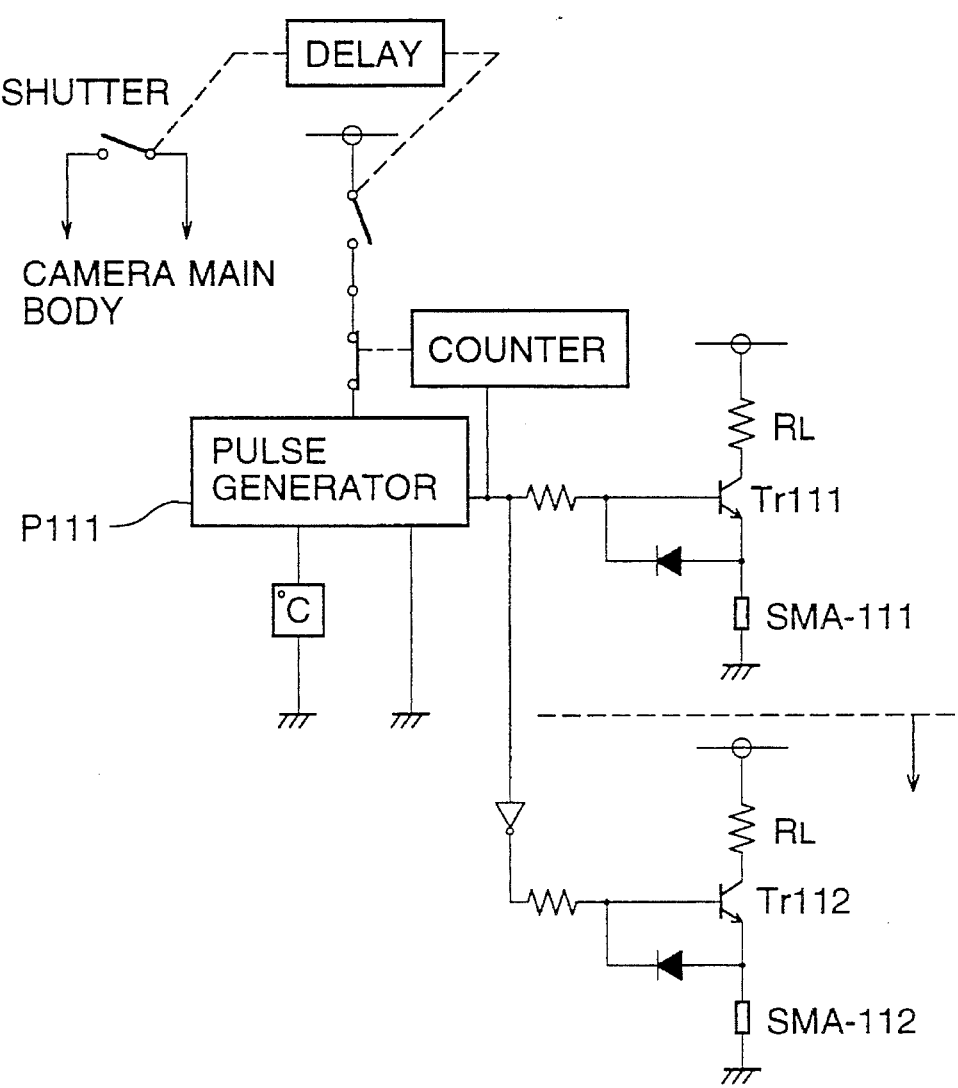
FIG. 35 represents a theoretical structural diagram of an automatic film-winding mechanism provided with a driving member composed of an SMA(a shape memory alloy) fine wire.

Next, the fifth example wherein characteristics of an SMA as an actuator are utilized in an automatic film winding mechanism will be explained as follows, referring to FIG. 34 showing a structural diagram and FIG. 35 showing a structural diagram of a driving circuit therefor.

First, as shown in FIG. 34-a, on the upper end of lever 114 whose lower end is supported rotatably in fixing section K114, there is provided claw 111 that is supported rotatably against the lever 114 and is urged to pedestal 112 by leaf spring 113. Further, two SMA fine wires are attached to the lever 114 in a manner that the lever 114 is pulled to both sides by the fine wires, and other ends of the two fine wires are affixed respectively on fixing sections K111 and K112. FIG. 34-a shows a state wherein the driving member SMA-112 is shortest and the driving member SMA-111 longest. Under this condition, when the driving member SMA-111 is electrified and heated, it starts recovering, and the lever 114 rotates in the arrowed direction in the figure and advances to the state in FIG. 34-b. During this period, sprocket 115 is rotated by a rotation of the lever 114 by a predetermined angle because sprocket 115 for film advancing is just positioned at the tip of the claw 111. Accordingly, a film (not shown) wound round a shaft of the sprocket 115 is advanced by an amount corresponding to the rotation of the sprocket 115. In the figure, a film is advanced by an amount corresponding to one pitch of the sprocket.

Next, when driving member SMA-112 is electrified and heated under the condition shown in FIG. 34-b, it starts recovering and lever 114 starts rotating in the direction opposite to the previous direction (FIG. 34-c). With regard to a sprocket for advancing a film, there is provided thereon a ratchet (not shown) so that the sprocket rotates only in one direction (clockwise direction in the figure). Therefore, claw 111 is inclined on lever 114 against leaf spring 113 and passes under teeth of the sprocket 115 to return to the state shown in FIG. 34-a.

Under the above-mentioned condition, when SMA-111 is electrified and heated again, there is shown the progress identical to that in the previous occasion. Namely, the lever is rotated by the balance in pulling each other of SMA-111 and SMA-112, and thereby sprocket 115 is rotated for regular feeding to advance a film.

A driving circuit for the film-winding mechanism mentioned above is an extremely simple pulse-driving circuit wherein pulses having a constant cycle are generated and SMA-111 and SMA-112 are driven by the pulses. However, since SMA-111 and SMA-112 are opposite in terms of direction concerning recovery and deformation, only one of inputs to transistor switch Tr 112 electrifying from pulse generating unit P111 to SMA-112 is reversed by an inverter.

Further, since recovering speed and deforming speed of an SMA depend on ambient temperature, the pulse-generating unit P111 is provided with a temperature sensor detecting ambient temperature, so that an influence of ambient temperature may be taken into consideration. When a shutter button is pressed, a DELAY unit causes a pulse generating unit to be turned on after a certain period of time wherein a shutter operation is completed. In the course that the sprocket 115 is advanced in succession in the aforementioned procedures, the number of pulses necessary for feeding one frame of a film is counted by a counter, and film feeding is stopped after pulses in quantity of the predetermined number are counted.

Figure 36:
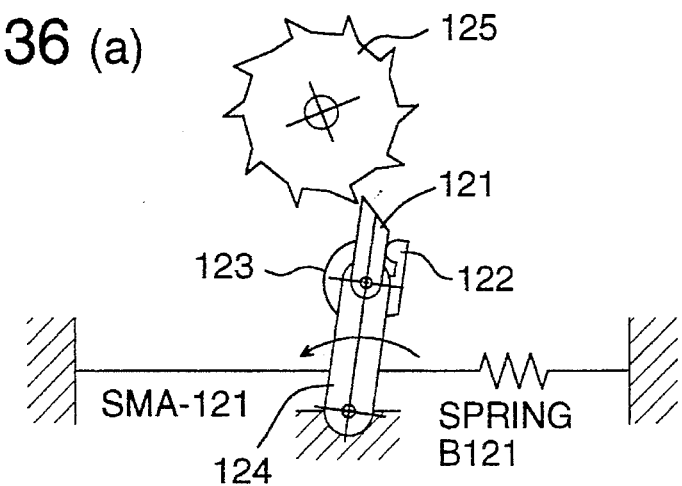
FIGS. 36(a)–36(c) represent a theoretical structural diagram of an automatic film-winding mechanism provided with a driving member composed of an SMA(a shape memory alloy).fine wire and a spring.
Figure 36:
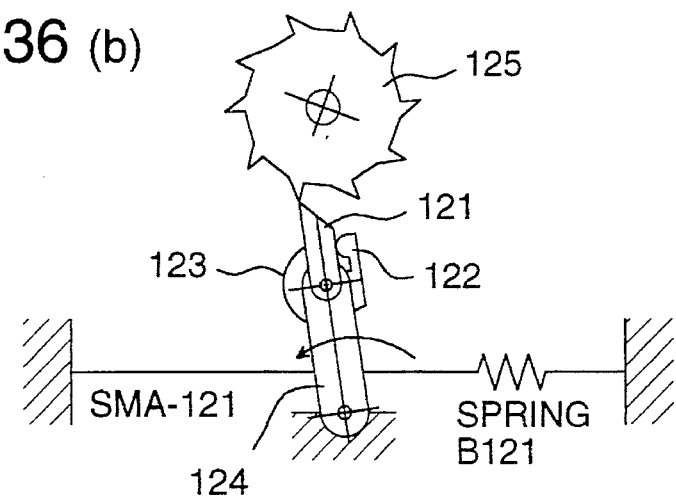
Figure 36:
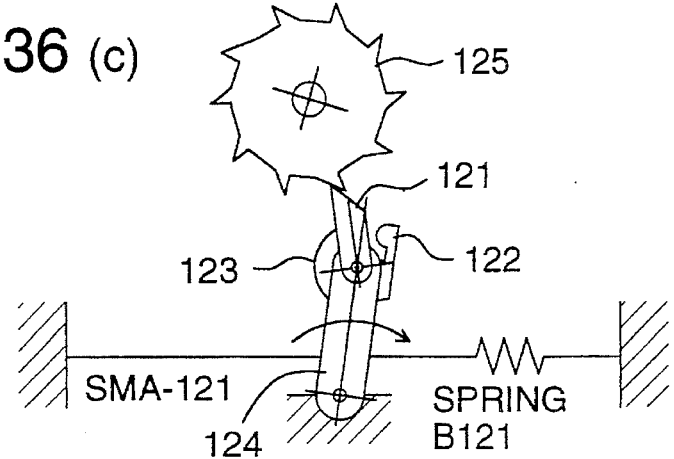

One (SMA-112 in this case) of SMA-111 and SMA-112 may be eliminated to be replaced with spring B121 as shown in FIG. 36. FIG. 36-a shows the state wherein SMA-111 is not heated, lever 124 is pulled to the right side by spring B121 and SMA-111 is in its longest state. Under this condition, when SMA-111 is heated, it starts recovering to rotate lever 124 and goes to the state shown in FIG. 36-c through FIG. 36-b.

Next, when SMA-111 is deenergized, it is pulled by spring B121 and returns from the state in FIG. 36-c to that in FIG. 36-a through FIG. 36-b in the same mechanism as in the previous occasion and in the opposite procedure thereto. A driving circuit for this may be one shown in FIG. 35 from which a circuit position for electrifying SMA-112 encircled with broken lines is eliminated. In this case, lever 124 is rotated by the balance in pulling each other of SMA-111 and spring B121.

Due to the constitution mentioned above, an extremely low-priced automatic film-winding unit has been realized.

Incidentally, the selftimer mechanism and its driving circuit can naturally be applied widely not only to a camera but also to general image equipment including a video camera or the like, image forming apparatuses such as a copying machine or the like and various optical equipment.

Figure 37:
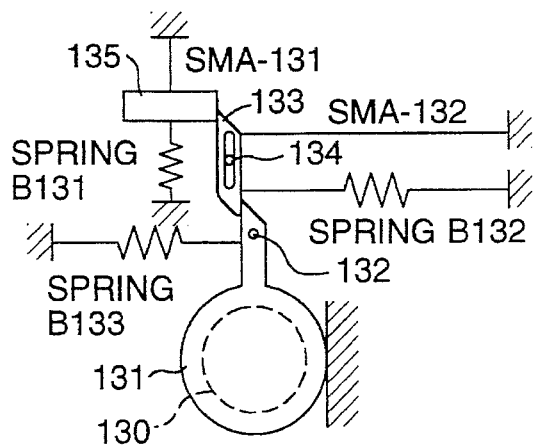
FIGS. 37(a)–37(e) represent a structural diagram of a shutter mechanism provided with a driving member composed of two SMA(a shape memory alloy).fine wires.
Figure 37:
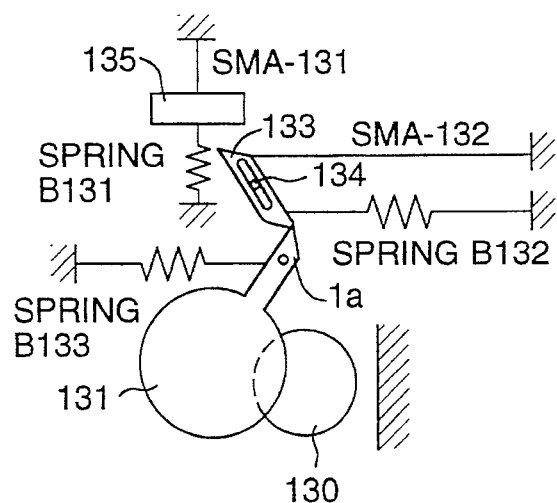
Figure 37:
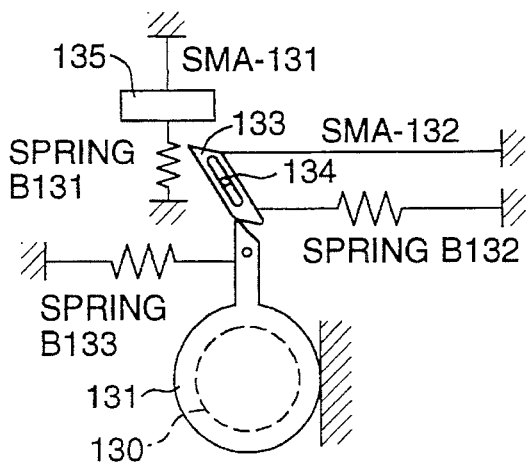
Figure 37:
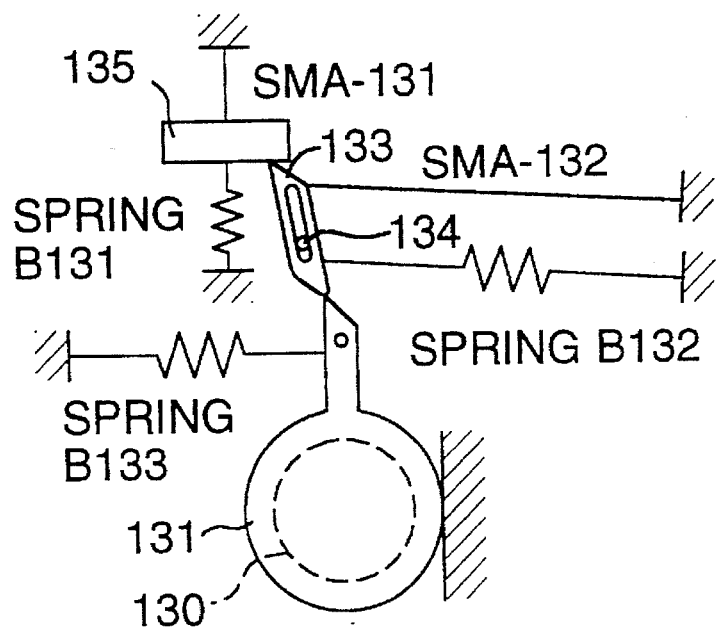
Figure 37:
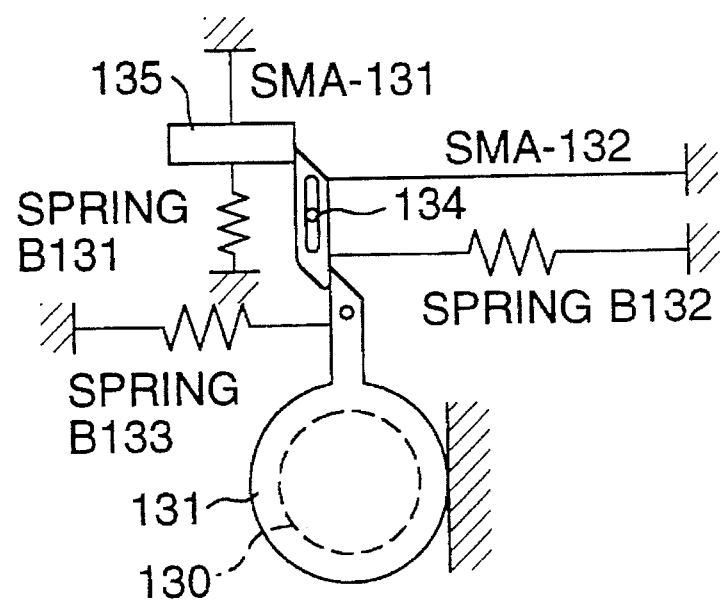
Figure 38:
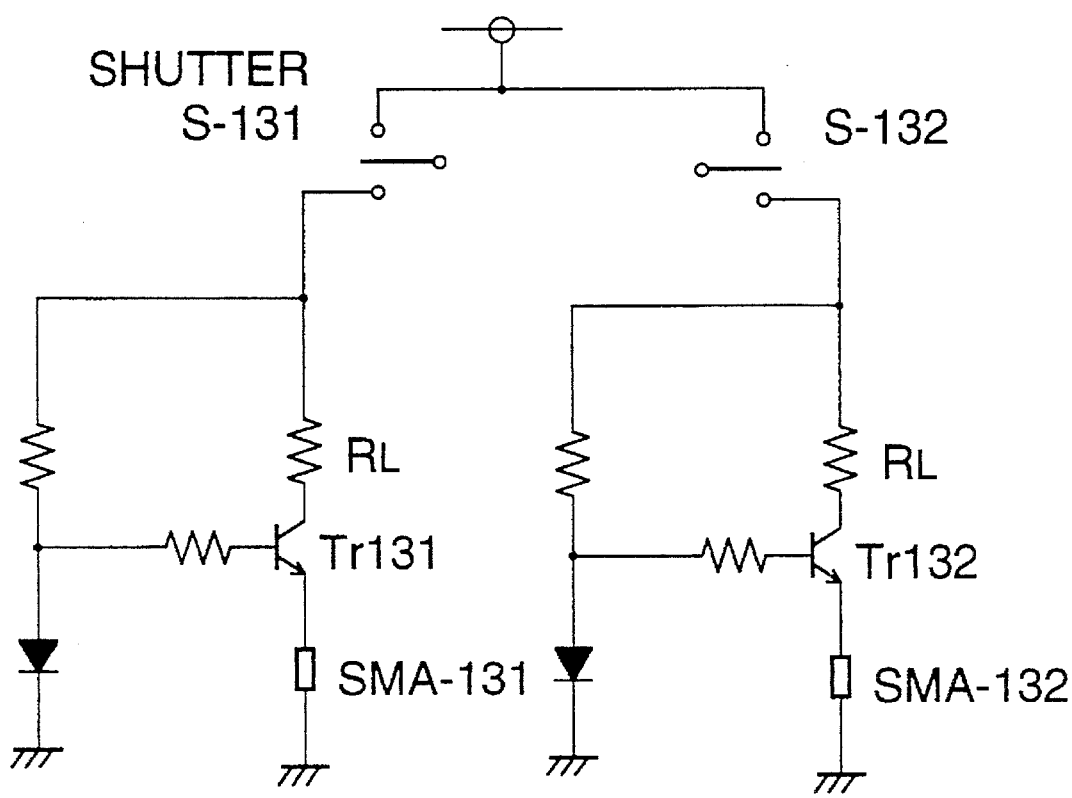
FIG. 38 represents a driving circuit diagram of a shutter mechanism provided with a driving member composed of two SMA (a shape memory alloy).fine wires.

Next, a sixth example wherein characteristics of an SMA as an actuator are utilized in shutter control will be explained as follows, referring to FIG. 37 showing a structural diagram and FIG. 38 showing a driving circuit therefor.

First, as shown in FIG. 37-a, opening O of a camera is covered by shutter 131. The shutter 131 is pivotted rotatably with fulcrum 132 as a center of rotating. The shutter 131 is urged for counterclockwise rotation in the figure by spring B133 with fulcrum 132 as a center. Lever 133 is supported by SMA-132 and spring B132 with fulcrum 134 as an axis. The lever 133 is urged by spring B132 for counterclockwise rotation in the figure. Stopper 135 is supported by driving member SMA-131 and spring B131 in a manner that the stopper pulls downward in the figure. Under the state shown in FIG. 37-a, driving member SMA-131 is in its extremely extended state and the stopper 135 is preventing the lever 133 from rotating.

Under the condition mentioned above, when driving member SMA-131 is electrified and heated to elevate stopper 135, the lever 133 is freed for rotation and it is rotated counterclockwise by spring B132. Thus, the tip of the lever 133 pushes the tip of protrusion 131a of the shutter 131. Therefore, the shutter 131 rotates clockwise with fulcrum 132 as a center against spring B133 to uncover the opening O for exposure (FIG. 37-b).

After the shutter 131 has been opened fully, tip 131a of the protrusion of the shutter 131 passes through the lever 133 as shown in the figure so that the shutter may be closed (FIG. 37-c). Under this condition, when driving member SMA-132 is heated, the lever 133 rotates clockwise while passing through protrusion 131a of the shutter 131 (FIG. 37-d). When stopping electrifying the driving member SMA-131 when the lever 133 is on the summit of the protrusion 131a, the stopper 135 is lowered (FIG. 37-e).

Next, when stopping electrifying driving member SMA-132, it returns to the state identical to that in FIG. 37-a.

A driving circuit which drives for a series of the operations mentioned above can be a simple fixed current driving circuit as shown in FIG. 38. When switch S-131 is turned on, driving member SMA-131 is heated and thereby shutter 131 is operated in the processes as those described above (from FIG. 37-d to FIG. 37-c). Next, when switch S-132 is turned on, the state is changed from that in FIG. 37-d to that in FIG. 37-e, and when switches S-131 and S-132 are further turned off, the state returns to its initial state.

A period from the moment when the switch S-132 is turned on to the moment when switches S-131 and S-132 are turned off can be considered a shutter charging process.

Due to the constitution mentioned above, an extremely low-priced shutter unit has been realized.

Incidentally, the selftimer mechanism and the driving circuit therefor can naturally be applied widely not only to a camera but also to general image equipment including a video camera or the like, image forming apparatuses such as a copying machine or the like and various optical equipment.

What is claimed is:

1. A camera for exposing a photographic film comprising;

a lens for forming an image on said photographic film;

a diaphragm for adjusting an exposure amount of said image;

shape memory alloy members, including a first shape memory alloy member and a second shape memory alloy member, for controlling said diaphragm so as to adjust said exposure amount of said image, wherein said shape memory alloy members are movable between a first position in which the shape of said shape memory alloy members is recovered by heating, and a second position wherein said shape memory alloy member is deformed, said first shape memory alloy member being in said first position when said second shape memory alloy member is in said second position, and said first shape memory alloy member being in said second position when said second memory alloy member is in said first position; and an actuating member for heating one of said shape memory alloy members to displace said one of said shape memory alloy members from said first position to control said diaphragm.

2. The camera of claim 1 wherein said diaphragm includes an aperture blade having a plurality of apertures, with different diameters, said aperture blade being moved when one of said shape memory alloy members is heated, one of said apertures being selected by movement of said aperture blade.

3. The camera of claim 2 further comprising a flat spring having a first stable point and a second stable point, wherein said shape memory alloy members are provided with said flat spring to urge said aperture blade, said first shape memory alloy member being in said first position when said flat spring is at said first stable point, said first shape memory alloy member being in said second position when said flat spring is at said second stable point.

4. The camera of claim 1 wherein said actuating member includes a detector for detecting a brightness of an object, said actuating member selecting one of said shape memory alloy members to be heated in accordance with said brightness.

5. The camera of claim 1 wherein said actuating member includes an electric circuit for heating said shape memory alloy members.

6. The camera of claim 5 wherein said shape memory alloy members are movable according to an amount of electric current flowing through said shape memory alloy members via said electric circuit.

7. The camera of claim 1 wherein said diaphragm includes a plurality of blades forming an aperture, at least one of said blades being movable to adjust said exposure amount of said image when one of said shape memory alloy members is heated.

8. The camera of claim 7 wherein said first shape memory alloy member is heated to expand said aperture, and said second shape memory alloy member is heated to narrow said aperture.

9. The camera of claim 8 wherein said actuating member includes an electric circuit for heating said shape memory alloy members.

10. The camera of claim 9 wherein said electric circuit controls movement of said shape memory alloy member by changing a duty ratio of applying time of an electric current.

* * * * *